(12) United States Patent
Oba et al.

(10) Patent No.: US 6,560,130 B2
(45) Date of Patent: May 6, 2003

(54) CONTROL CIRCUIT FOR MULTIPHASE INVERTER APPARATUS

(75) Inventors: Norio Oba, Tokyo (JP); Yuushin Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,624

(22) Filed: Nov. 5, 2001

(65) Prior Publication Data

US 2002/0196645 A1 Dec. 26, 2002

(30) Foreign Application Priority Data

Jun. 6, 2001 (JP) ........................................ 2001-171250

(51) Int. Cl.[7] .............................................. H02M 5/42
(52) U.S. Cl. ...................... 363/97; 363/131; 318/768; 318/801; 318/806
(58) Field of Search ............................ 363/16, 17, 97, 363/98, 131, 132; 318/767, 768, 798–806

(56) References Cited

U.S. PATENT DOCUMENTS

| | | | | |
|---|---|---|---|---|
| 5,038,092 A | * | 8/1991 | Asano et al. | 318/811 |
| 5,231,339 A | * | 7/1993 | Kishimoto et al. | 318/807 |
| 5,729,113 A | * | 3/1998 | Jansen et al. | 318/616 |
| 5,798,628 A | * | 8/1998 | Fujita et al. | 318/805 |
| 5,942,876 A | * | 8/1999 | Maekawa | 318/801 |
| 6,194,864 B1 | * | 2/2001 | Kinpara et al. | 318/805 |
| 6,307,759 B1 | * | 10/2001 | Inarida et al. | 363/37 |
| 6,385,555 B1 | * | 5/2002 | Hoffmann et al. | 388/806 |
| 6,400,118 B2 | * | 6/2002 | Kinpara et al. | 318/254 |

FOREIGN PATENT DOCUMENTS

JP 2000-316284 11/2000

OTHER PUBLICATIONS

"Current–Control Type PWM Inverter Capable Of Suppressing Higher Harmonic Currents And Capable Of High Speed Current Response", The Journal of the Institute of Electrical Engineers of Japan, vol. 1.12B, Nymber 2, 1986, pp. 9–16.

* cited by examiner

Primary Examiner—Michael Sherry
Assistant Examiner—Gary L. Laxton
(74) Attorney, Agent, or Firm—Leydig, Voit & Mayer, Ltd.

(57) ABSTRACT

In a control circuit for a power converting apparatus, such as a three-phase inverter, unnecessary switching operations of switching elements are avoided. The control circuit includes current sensors for detecting inverter currents; a three-phase current command generating circuit for generating a current command value; adders/substracters for calculating current deviation between the current command value and the inverter current; a voltage detecting circuit for detecting voltages of three-phase power supplies; and a pulse width modulation (PWM) pattern selector circuit obtaining a current deviation vector from the current deviation, setting an allowable range region with respect to the current deviation vector, when the current deviation vector is not located within the allowable range region, obtaining a moving direction of the current deviation vector as to output voltage vectors of the power converting apparatus based upon the power supply voltage vector, and outputting an output voltage vector in which the moving direction of the current deviation vector, among moving directions, is directed to the allowable range region.

10 Claims, 20 Drawing Sheets

CURRENT DEVIATION VECTOR

FIG. 8

| WEIGHTING OPERATION | | PREVIOUSLY-SELECTED MODE | | | | | | | |
|---|---|---|---|---|---|---|---|---|---|
| | | k0 | k1 | k3 | k2 | k6 | k4 | k5 | k7 |
| PRESENTLY-SELECTED MODE | k0 | ONE TIME | ONE TIME | ONE TIME | ONE TIME | ONE TIME | ONE TIME | ONE TIME | ONE TIME |
| | k1 | ONE TIME | ONE TIME | ONE TIME | TWO TIMES | TWO TIMES | TWO TIMES | ONE TIME | TWO TIMES |
| | k3 | TWO TIMES | ONE TIME | ONE TIME | ONE TIME | TWO TIMES | TWO TIMES | TWO TIMES | ONE TIME |
| | k2 | ONE TIME | TWO TIMES | ONE TIME | ONE TIME | ONE TIME | TWO TIMES | TWO TIMES | TWO TIMES |
| | k6 | TWO TIMES | TWO TIMES | TWO TIMES | ONE TIME | ONE TIME | ONE TIME | TWO TIMES | ONE TIME |
| | k4 | ONE TIME | TWO TIMES | TWO TIMES | TWO TIMES | ONE TIME | ONE TIME | ONE TIME | TWO TIMES |
| | k5 | TWO TIMES | ONE TIME | TWO TIMES | TWO TIMES | TWO TIMES | ONE TIME | ONE TIME | ONE TIME |
| | k7 | ONE TIME | ONE TIME | ONE TIME | ONE TIME | ONE TIME | ONE TIME | ONE TIME | ONE TIME |

FIG. 10

| WEIGHTING OPERATION | | PREVIOUSLY-SELECTED MODE | | | | | | | |
|---|---|---|---|---|---|---|---|---|---|
| | | k0 | k1 | k3 | k2 | k6 | k4 | k5 | k7 |
| PRESENTLY-SELECTED MODE | k0 | ONE TIME | ONE TIME | TWO TIMES | ONE TIME | TWO TIMES | ONE TIME | TWO TIMES | THREE TIMES |
| | k1 | ONE TIME | ONE TIME | ONE TIME | TWO TIMES | TWO TIMES | TWO TIMES | ONE TIME | TWO TIMES |
| | k3 | TWO TIMES | ONE TIME | ONE TIME | ONE TIME | TWO TIMES | TWO TIMES | TWO TIMES | ONE TIME |
| | k2 | ONE TIME | TWO TIMES | ONE TIME | ONE TIME | ONE TIME | TWO TIMES | TWO TIMES | TWO TIMES |
| | k6 | TWO TIMES | TWO TIMES | TWO TIMES | ONE TIME | ONE TIME | ONE TIME | TWO TIMES | ONE TIME |
| | k4 | ONE TIME | TWO TIMES | TWO TIMES | TWO TIMES | ONE TIME | ONE TIME | ONE TIME | TWO TIMES |
| | k5 | TWO TIMES | ONE TIME | TWO TIMES | TWO TIMES | TWO TIMES | ONE TIME | ONE TIME | ONE TIME |
| | k7 | THREE TIMES | TWO TIMES | ONE TIME | TWO TIMES | ONE TIME | TWO TIMES | ONE TIME | ONE TIME |

FIG. 14

| WEIGHTING OPERATION | | PREVIOUSLY-SELECTED MODE | | | | | | | |
|---|---|---|---|---|---|---|---|---|---|
| | | k0 | k1 | k3 | k2 | k6 | k4 | k5 | k7 |
| PRESENTLY-SELECTED MODE | k0 | ONE TIME | TWO TIMES | TWO TIMES | ONE TIME | ONE TIME | ONE TIME | TWO TIMES | THREE TIMES |
| | k1 | ONE TIME | ONE TIME | ONE TIME | TWO TIMES | TWO TIMES | TWO TIMES | ONE TIME | TWO TIMES |
| | k3 | TWO TIMES | ONE TIME | ONE TIME | ONE TIME | TWO TIMES | TWO TIMES | TWO TIMES | ONE TIME |
| | k2 | ONE TIME | TWO TIMES | ONE TIME | ONE TIME | ONE TIME | TWO TIMES | TWO TIMES | TWO TIMES |
| | k6 | TWO TIMES | TWO TIMES | TWO TIMES | ONE TIME | ONE TIME | ONE TIME | TWO TIMES | ONE TIME |
| | k4 | ONE TIME | TWO TIMES | TWO TIMES | TWO TIMES | ONE TIME | ONE TIME | ONE TIME | TWO TIMES |
| | k5 | TWO TIMES | ONE TIME | TWO TIMES | TWO TIMES | TWO TIMES | ONE TIME | ONE TIME | ONE TIME |
| | k7 | THREE TIMES | ONE TIME | ONE TIME | TWO TIMES | TWO TIMES | TWO TIMES | ONE TIME | ONE TIME |

FIG. 15

| WEIGHTING OPERATION | | PREVIOUSLY-SELECTED MODE | | | | | | | |
|---|---|---|---|---|---|---|---|---|---|
| | | k0 | k1 | k3 | k2 | k6 | k4 | k5 | k7 |
| PRESENTLY-SELECTED MODE | k0 | ONE TIME | ONE TIME | TWO TIMES | TWO TIMES | TWO TIMES | ONE TIME | ONE TIME | THREE TIMES |
| | k1 | ONE TIME | ONE TIME | ONE TIME | TWO TIMES | TWO TIMES | TWO TIMES | ONE TIME | TWO TIMES |
| | k3 | TWO TIMES | ONE TIME | ONE TIME | ONE TIME | TWO TIMES | TWO TIMES | TWO TIMES | ONE TIME |
| | k2 | ONE TIME | TWO TIMES | ONE TIME | ONE TIME | ONE TIME | TWO TIMES | TWO TIMES | TWO TIMES |
| | k6 | TWO TIMES | TWO TIMES | TWO TIMES | ONE TIME | ONE TIME | ONE TIME | TWO TIMES | ONE TIME |
| | k4 | ONE TIME | TWO TIMES | TWO TIMES | TWO TIMES | ONE TIME | ONE TIME | ONE TIME | TWO TIMES |
| | k5 | TWO TIMES | ONE TIME | TWO TIMES | TWO TIMES | TWO TIMES | ONE TIME | ONE TIME | ONE TIME |
| | k7 | THREE TIMES | TWO TIMES | ONE TIME | ONE TIME | ONE TIME | TWO TIMES | TWO TIMES | ONE TIME |

FIG. 16

| WEIGHTING OPERATION | | PREVIOUSLY-SELECTED MODE | | | | | | | |
|---|---|---|---|---|---|---|---|---|---|
| | | k0 | k1 | k3 | k2 | k6 | k4 | k5 | k7 |
| PRESENTLY-SELECTED MODE | k0 | ONE TIME | ONE TIME | ONE TIME | ONE TIME | TWO TIMES | TWO TIMES | TWO TIMES | THREE TIMES |
| | k1 | ONE TIME | ONE TIME | ONE TIME | TWO TIMES | TWO TIMES | TWO TIMES | ONE TIME | TWO TIMES |
| | k3 | TWO TIMES | ONE TIME | ONE TIME | ONE TIME | TWO TIMES | TWO TIMES | TWO TIMES | ONE TIME |
| | k2 | ONE TIME | TWO TIMES | ONE TIME | ONE TIME | ONE TIME | TWO TIMES | TWO TIMES | TWO TIMES |
| | k6 | TWO TIMES | TWO TIMES | TWO TIMES | ONE TIME | ONE TIME | ONE TIME | TWO TIMES | ONE TIME |
| | k4 | ONE TIME | TWO TIMES | TWO TIMES | TWO TIMES | ONE TIME | ONE TIME | ONE TIME | TWO TIMES |
| | k5 | TWO TIMES | ONE TIME | TWO TIMES | TWO TIMES | TWO TIMES | ONE TIME | ONE TIME | ONE TIME |
| | k7 | THREE TIMES | TWO TIMES | TWO TIMES | TWO TIMES | ONE TIME | ONE TIME | ONE TIME | ONE TIME |

FIG. 21 PRIOR ART

| MODE | SWITCHING STATE | | |
|---|---|---|---|
| | W | V | U |
| | Z | Y | X |
| k0 | OFF | OFF | OFF |
| | ON | ON | ON |
| k1 | OFF | OFF | ON |
| | ON | ON | OFF |
| k2 | OFF | ON | OFF |
| | ON | OFF | ON |
| k3 | OFF | ON | ON |
| | ON | OFF | OFF |
| k4 | ON | OFF | OFF |
| | OFF | ON | ON |
| k5 | ON | OFF | ON |
| | OFF | ON | OFF |
| k6 | ON | ON | OFF |
| | OFF | OFF | ON |
| k7 | ON | ON | ON |
| | OFF | OFF | OFF |

FIG. 22  PRIOR ART

| REGION OF e | REGION OF ΔI | | | | | | |
|---|---|---|---|---|---|---|---|
| | ① | ③ | ② | ⑥ | ④ | ⑤ | ⑦ |
| [I] | k1 | k3 | k3 | k0,k7 | k0,k7 | k1 | HOLD |
| [III] | k3 | k3 | k2 | k2 | k0,k7 | k0,k7 | HOLD |
| [II] | k0,k7 | k2 | k2 | k6 | k6 | k0,k7 | HOLD |
| [VI] | k0,k7 | k0,k7 | k6 | k6 | k4 | k4 | HOLD |
| [IV] | k5 | k0,k7 | k0,k7 | k4 | k4 | k5 | HOLD |
| [V] | k1 | k1 | k0,k7 | k0,k7 | k5 | k5 | HOLD |

CONTROL CIRCUIT FOR MULTIPHASE INVERTER APPARATUS

BACKGROUND OF THE INVENTION

1. Field of the Invention

The present invention relates to a control circuit for instantaneous waveform control power converting apparatus for controlling an instantaneous output current, the power converting apparatus being, for example, a sine wave voltage outputting inverter including a motor driving inverter, a high power factor converter, an active filter, and an LC filter. More specifically, the present invention relates to a control circuit including of a plurality of switching elements which perform a plurality of switching operations within one cycle.

2. Description of the Related Art

Referring now to drawings, a description will be made of a conventional control circuit used in a power converting apparatus. FIG. 17 is a diagram for showing an arrangement of the conventional control circuit designed for a power converting apparatus, which is described in, for example, the Japanese publication entitled "CURRENT CONTROL TYPE PWM INVERTER CAPABLE OF SUPPRESSING HIGHER HARMONIC AND OF REALIZING HIGH-SPEED CURRENT RESPONSE" of Japanese Electric Institute Publication VOL. 12B, No. 2 (1986), on pages 9 to 16. It should be noted that the arrangement of FIG. 17 is indicated by rewriting the construction of the conventional control circuit of the inverter described in the above-explained Japanese publication in a similar form to that of the present invention.

In FIG. 17, reference numeral 1 indicates a three-phase inverter main circuit, reference numeral 2 indicates a load such as a motor, reference numeral 4 represents a DC power supply, and symbols 10U, 10V; 10W indicate current sensors for detecting an inverter current. Also, reference numeral 801 shows a three-phase sine wave current command generating circuit, reference numeral 802 shows a current deviation vector detecting circuit, reference numeral 803 is a back electromotive force predicting circuit for predicting back electromotive forces VBOU, VBOV, VBOW which are produced across the load, reference numeral 804 shows a PWM pattern table circuit, and reference numerals 851U, 851V, 851W indicate adders/subtracters.

Also, in FIG. 17, reference numerals 21U, 21V, 21W show internal inductances of the load 2, and reference numerals 22U, 22V, 22W show internal-induced voltages of the load 2.

FIG. 18 is a diagram for representing the arrangement of the three-phase inverter main circuit 1.

As indicated in FIG. 18, this three-phase inverter main circuit 1 is arranged by, for instance, a full-bridge circuit by employing switching elements S1 to S6.

Next, operations of the conventional control circuit used in the power converting apparatus will now be explained with reference to drawings.

In FIG. 17, the control circuit is arranged as a current control loop for performing an instantaneous current control. The adders/subtracters 851U, 851V, 851W calculate current deviations ΔiU, ΔiV, ΔiW between current command values IAU*, IAV*, IAW*, and inverter currents IAU, IAV, IAW detected by the current sensors 10U, 10V, 10W. The current command values correspond to outputs of the three-phase sine wave current command generating circuit 801, and should be supplied by the inverter. The back electromotive force predicting circuit 803 predicts the back electromotive forces VBOU, VBOV, VBOW produced across the load from the current deviations ΔiU, Δiv, ΔiW so as to acquire a back electromotive force vector VB, and then, detects which region selected from a region [I] to a region [VI] indicated in FIG. 19 this back electromotive force vector VB is present.

FIG. 19 is a diagram for showing the six regions [I] through [VI] which are segmented by 8 sorts of voltage vectors V0 to V7, which are outputted in response to conditions of the switching elements of the inverter 1.

The current deviation vector detecting circuit 802 obtains a current deviation vector ΔI from the above-explained current deviations ΔiU, ΔiV, ΔiW, and then, detects which region selected from regions (1) to (7) shown in FIG. 20 this current deviation vector ΔI is present.

For the sake of convenient explanations, circled numerals which are shown in the respective drawings are described as (1), (2), (3) etc., in this specification.

A predetermined allowable range which is defined based upon precision of a current control is set with respect to the current deviation vector ΔI and the region (7) indicates that this current deviation vector ΔI is located in the allowable range. The regions (1) to (6), which are located at an outer circumference of this region (7), represent that the current deviation vector ΔI is located outside the allowable range.

The PWM pattern table circuit 804 selects switching modes k0 to k7 from both the region of the back electromotive force vector VB and the region of the current deviation vector ΔI in accordance with a table of FIG. 22. The PWM pattern table circuit 804 determines switching conditions of the six switching elements employed in the three-phase inverter 1 shown in FIG. 21 based upon these switching modes k0 to k7.

For instance, in such a case that the back electromotive force vector VB is present in the region [I], this PWM pattern table circuit 804 selects the switching mode k1 when the current deviation vector ΔI is located in either the region (1) or the region (5). Also, this PWM pattern table circuit 804 selects the switching mode k3 when the current deviation vector ΔI is located in either the region (2) or the region (3). Also, this PWM pattern table circuit 804 selects the switching mode k0 or k7 when the current deviation vector ΔI is located in either the region (4) or the region (6). Also, the PWM pattern table circuit 804 selects a proper switching mode such that this switching mode is directly kept when the current deviation vector ΔI is located in the region (7).

The three-phase inverter 1 turns ON/OFF the switching elements in response to the switching command of the PWM pattern table circuit 804 so as to control the inverter currents IAU, IAV, IAW.

Next, an explanation is made of how the current deviation vector ΔI is transferred under the above-explained control operation.

For example, the following case will now be considered. That is, in FIG. 19, the back electromotive force vector VB is present at VL with the region [I]. Also, in FIG. 20, the current deviation vector ΔI is present at ΔIa within the region (1).

From FIG. 22, the switching mode k1 is selected under this condition, and the current deviation vector ΔI is moved along the direction of VL1 equal to a difference between VL and V1 shown in FIG. 19, and then, is entered from ΔIa of FIG. 20 into the region (7) within the allowable range.

However, in such a case that the current deviation vector ΔI is located at ΔIb shown in FIG. 20, the switching mode k1 is similarly selected, whereas the current deviation vector ΔI is not entered into the allowable range, but is once moved to the region (3). Subsequently, since the switching mode k3 is selected based upon both the region [I] and the region (3), the current deviation vector ΔI is moved along the direction of VL3, and then is entered into the region (7) which is located in the allowable range.

In this case, if the switching mode k3 is selected at such a time instant when the current deviation vector ΔI is present at ΔIb, then the current deviation vector ΔI is moved along a dotted line of FIG. 20. As a result, it is most probably possible to enter the current deviation vector ΔI into the region (7) in the allowable range by changing the switching mode one time.

The above-described conventional control circuit for the power converting apparatus has the following problem. That is, since there is such a possibility that the optimum output voltage vector used to enter the current deviation vector ΔI into the allowable range cannot be selected only once, extra switching operations are carried out. As a result, the power losses of the switching elements are increased, and therefore, the efficiency of the power converting apparatus is lowered.

SUMMARY OF THE INVENTION

The present invention has been made to solve the above-explained problem, and therefore, has an object to provide a control circuit of a power converting apparatus capable of selecting the optimum output voltage vector, while reducing a total number of switching times.

According to a first aspect of the present invention, there is provided a control circuit of a power converting apparatus, characterized by comprising: current detecting means for detecting an output current of the power converting apparatus; three-phase current command generating means for generating a current command value; adding/subtracting means for calculating a current deviation between the current command value and the output current; voltage detecting means for detecting a voltage of a three-phase power supply which is connected via a reactor to the power converting apparatus and for acquiring a power supply voltage vector from the detected voltage of the three-phase power supply; and switching command generating means operated in such a manner that a current deviation vector is obtained from the current deviation, an allowable range region is set with respect to the current deviation vector, in the case that the resulting current deviation vector is not located within the allowable range region, a moving direction of the current deviation vector as to a plurality of output voltage vectors of the power converting apparatus is obtained based upon the resulting power supply voltage vector, and then, the switching command generating means outputs such an output voltage vector in which the moving direction of the current deviation vector among the resulting plural moving directions is directed to the allowable range region.

A control circuit of a power converting apparatus according to a second aspect of the present invention is characterized in that the switching command generating means selects such an output voltage vector in which the moving direction of the current deviation vector among the resulting plural moving directions is directed to the allowable range region, and a time duration required to cause the current deviation vector to penetrate the allowable range region is the longest time.

A control circuit of a power converting apparatus according to a third aspect of the present invention is characterized in that the power converting apparatus is a three-phase inverter constituted by a plurality of switching elements; and the switching command generating means selects an output voltage vector in which the moving direction of the current deviation vector among the resulting plural moving directions is directed to the allowable range region, and such a value obtained by multiplying the time duration required to cause the current deviation vector to penetrate the allowable range region by a weight coefficient is the longest value; the weight coefficient corresponding to a total switching time of the plural switching elements, which is required for changing the switching mode.

A control circuit of a power converting apparatus according to a fourth aspect of the present invention is characterized in that the switching command generating means calculates such an evaluation function, and selects the output voltage vector based upon the evaluation function, the evaluation function being calculated by multiplying a time duration required in that the current deviation vector passes through the allowable range region when a zero voltage vector is outputted by a weighing coefficient which is determined by a total switching time and is required for changing the switching mode.

A control circuit of a power converting apparatus according to a fifth aspect of the present invention is characterized in that the allowable range region is a hexagon.

A control circuit of a power converting apparatus according to a sixth aspect of the present invention is characterized in that the respective edges of the hexagon are arranged so as to be intersected at a right angle with respect to actual voltage vectors outputted from the power converting apparatus.

A control circuit of a power converting apparatus according to a seventh aspect of the present invention is characterized in that the respective edges of the hexagon are arranged so as to be intersected at an angle of 60 degrees with respect to actual voltage vectors outputted from the power converting apparatus.

A control circuit of a power converting apparatus according to an eighth aspect of the present invention is characterized in that when the resulting current deviation vector is not present in the allowable range region, the switching command generating means does not change a switching command to be outputted in such a case that a presently-outputted switching command causes the current deviation vector to be moved along the direction of the allowable range region.

A control circuit of a power converting apparatus according to a ninth aspect of the present invention is characterized in that the switching command generating means calculates such an evaluation function, and selects the switching mode based upon the evaluation function, the evaluation function being calculated by multiplying a time duration required in that the current deviation vector passes through the allowable range region when a zero voltage vector is outputted by a weighing coefficient which is determined by an unbalanced use of switching times with respect to each of the phases, and is required for changing the switching mode.

A control circuit of a power converting apparatus according to a tenth aspect of the present invention is characterized in that the switching command generating means acquires the moving direction of the current deviation vector based upon a change rate of a current command.

BRIEF DESCRIPTION OF THE DRAWINGS

For a better understanding of the present invention, reference is made of a detailed description to be read in conjunction with the accompanying drawings, in which:

FIG. 8 is a diagram for indicating a weight coefficient for the control circuit of the power converting apparatus according to Embodiment 3 of the present invention;

FIG. 10 is a diagram for indicating a weight coefficient for a control circuit of a power converting apparatus according to Embodiment 4 of the present invention;

FIG. 14 is a diagram for indicating a weight coefficient for a control circuit of a power converting apparatus according to Embodiment 7 of the present invention;

FIG. 15 is a diagram for indicating a weight coefficient for the control circuit of the power converting apparatus according to Embodiment 7 of the present invention;

FIG. 16 is a diagram for indicating a weight coefficient for the control circuit of the power converting apparatus according to Embodiment 7 of the present invention;

FIG. 21 is a diagram for representing the relationship between the modes and the switching conditions of the conventional control circuit of the power converting apparatus; and FIG. 22 is a diagram for indicating the relationship between the region of the back electromotive force and the region of the current deviation in the conventional control circuit of the power converting apparatus.

DETAILED DESCRIPTION OF THE PREFERRED EMBODIMENTS

Embodiment 1

Figure 1:
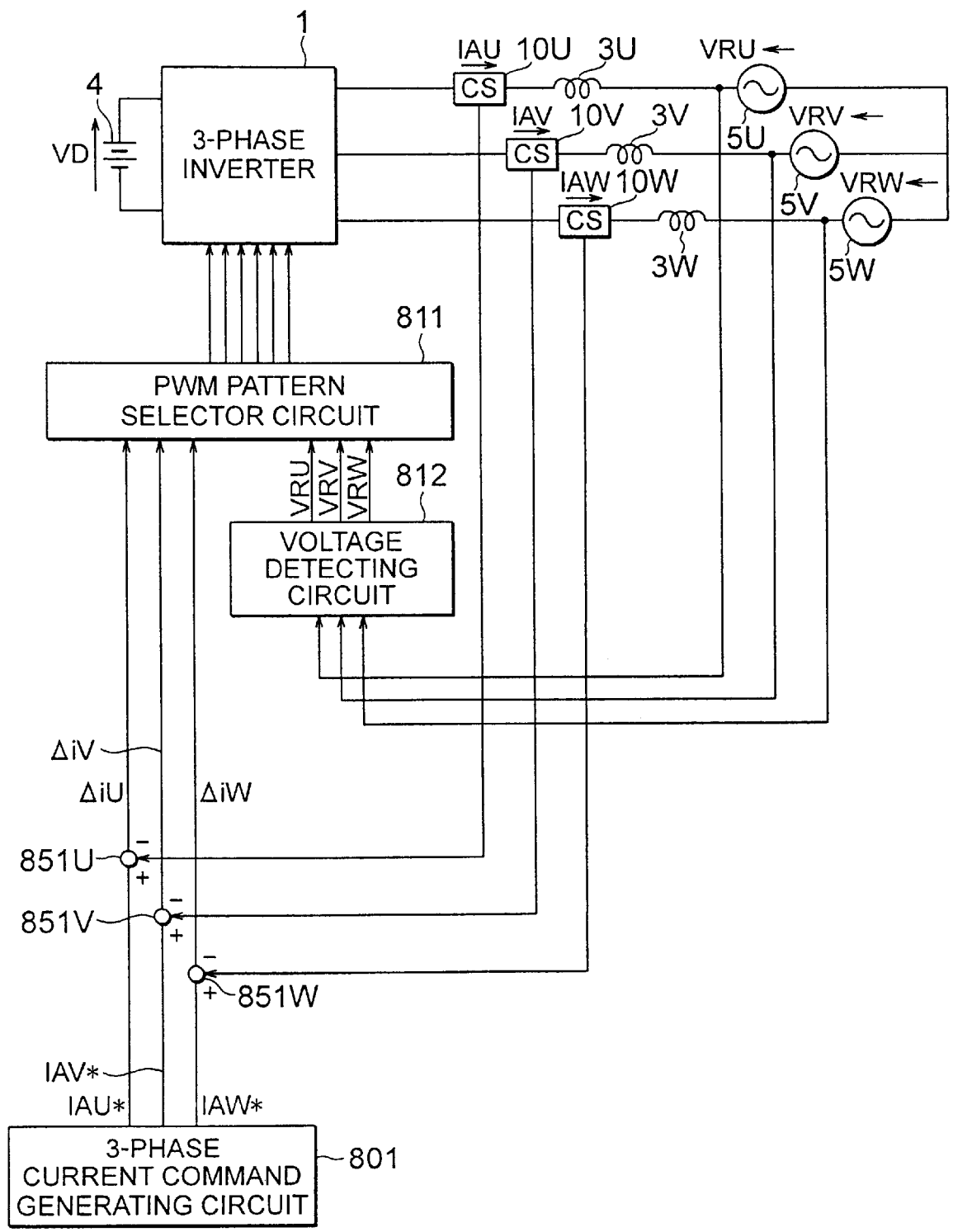
FIG. 1 is a diagram for showing an arrangement of a control circuit of a power converting apparatus according to Embodiment 1 of the present invention.

Referring now to drawings, a description will now be made of a control circuit of an electric power converting apparatus according to Embodiment 1 of the present invention. FIG. 1 is a diagram for representing an arrangement of this control circuit of the power converting apparatus according to Embodiment 1 of the present invention. It should be noted that the same reference symbols indicate the same, or similar elements shown in the respective drawings.

Figure 17:
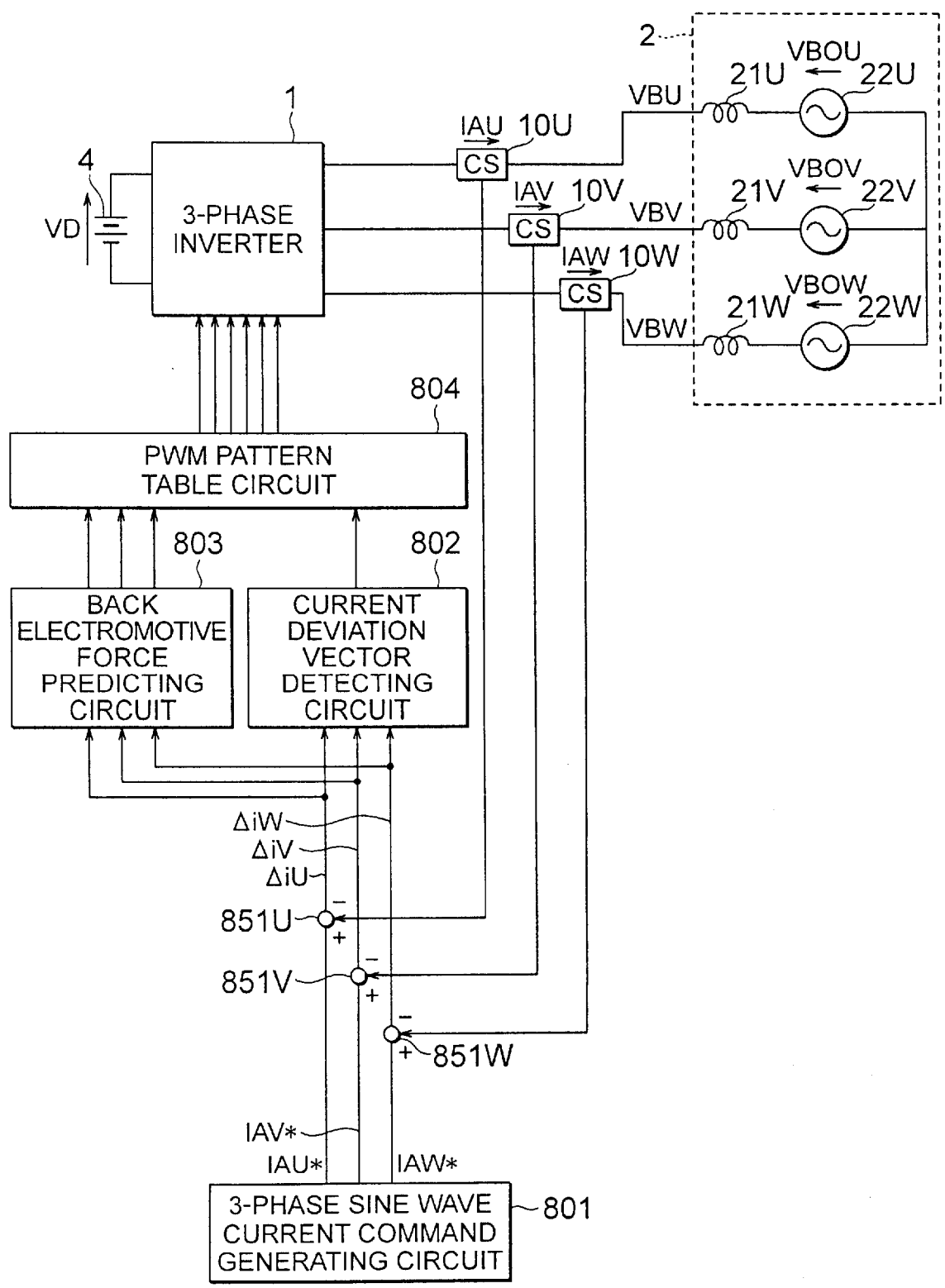
FIG. 17 is a diagram for showing an arrangement of a conventional control circuit of a power converting apparatus.

It should also be noted that the same reference symbols shown in FIG. 17 will be employed as those for indicating the same, or similar structural elements in FIG. 1, and the detailed description is omitted here.

In FIG. 1, reference numerals 3U, 3V, 3W show reactors; reference numerals 5U, 5V, 5W denote three-phase power supplies such as commercial power supplies; reference numeral 812 represents a voltage detecting circuit for detecting voltages VRU, VRV, VRW of the three-phase power supplies 5U, 5V, 5W; and reference numeral 811 shows a PWM pattern selector circuit. This PWM pattern selector circuit 811 may function as a switching command generating means. The switching command generating means selects a switching mode based upon a current deviation and the three-phase power supply voltages VRU, VRV, VRW detected by the voltage detecting circuit 812, and outputs ON/OFF signals corresponding to this selected switching mode to the respective switching elements of a three-phase inverter main circuit 1.

The three phase power supplies 5U, 5V, 5W may be operated as high power factor converter, or a system interconnecting inverter. The high power factor converter controls, for instance, currents flowing through the reactors 3U, 3V, 3W so as to become sine wave currents having a power factor of 1 with respect to the three-phase power supply by way of the three-phase inverter 1, and reactors 3U, 3V, 3W. The system interconnecting inverter is realized as an active filter for producing a higher harmonic current. Also, in an inverter of an uninterruptible power supply (UPS) apparatus having a filter constituted by a reactor and a capacitor, a capacitor voltage may be regarded as the three-phase power 5U, 5V, 5W.

Also, in FIG. 1, reference numeral 4 indicates a DC power supply; reference numerals 10U, 10V, 10W indicate current sensors for detecting inverter currents; reference numeral 801 represents a three-phase current command generating circuit; and reference numerals 851U, 851V, 851W show adders/substracters. The three-phase current command generating circuit 801 generates a current command having a sine wave shape when the high power factor converter is employed, and generates such a current command containing a high harmonic when the active filter is employed. Also, the three-phase current command generating circuit 801 generates such a current command capable of controlling a capacitor voltage to become a sine wave when the inverter of the uninterruptive power supply apparatus.

Next, operations of this control circuit of the power converting apparatus according to Embodiment 1 will now be described with reference to the relevant drawings.

Figure 18:
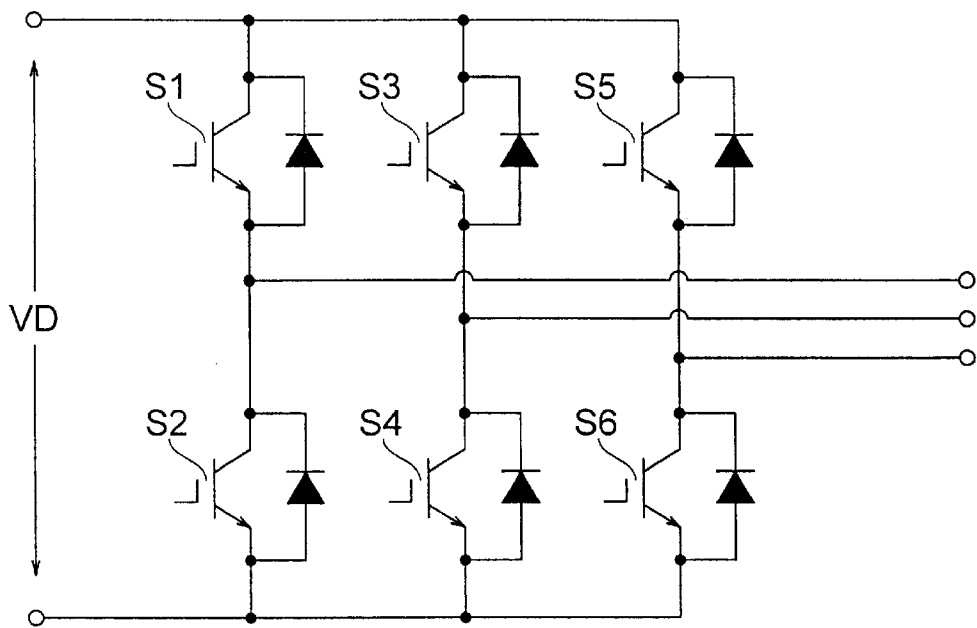
FIG. 18 is a diagram for representing an arrangement of a three-phase inverter employed in the conventional control circuit of the power converting apparatus.
Figure 19:
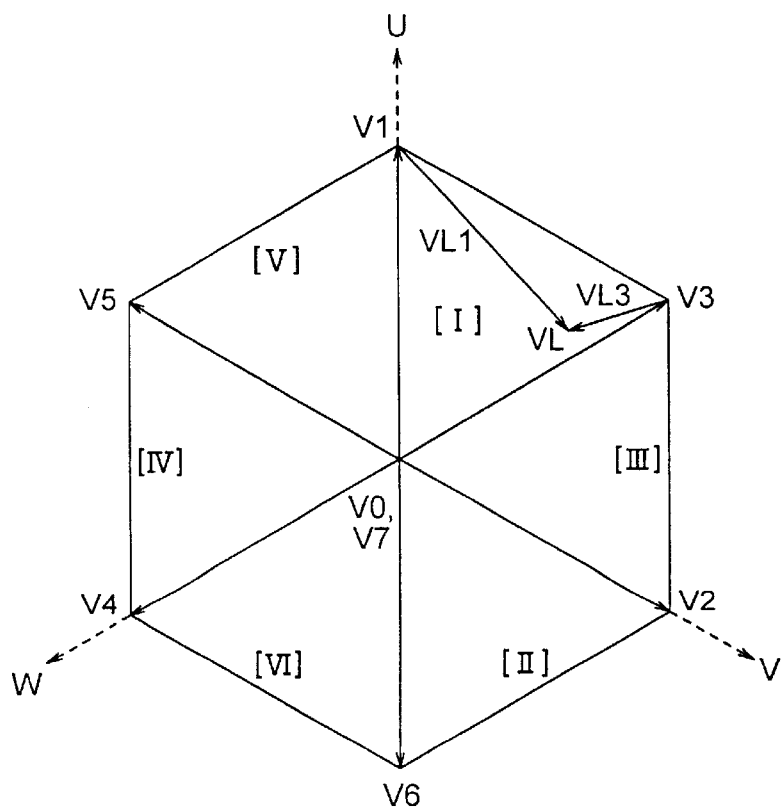
FIG. 19 is a diagram for showing a back electromotive force vector for the conventional control circuit of the power converting apparatus.

There are 8 sorts of voltage vectors which may be realized under such a condition that one of the switching elements of upper/lower arms (see FIG. 18) of the three-phase inverter main circuit 1 is turned ON, and the other element of these switching elements is turned OFF. FIG. 19 represents these voltage vectors on the UVW coordinate system.

In the case that the switching modes are defined as k0 to k7 with respect to the output voltage vectors V0 to V7, states of the respective switching elements are indicated in the table of FIG. 21. Symbols U, V, W, X, Y, Z shown in FIG. 21 correspond to the switching elements S1, S3, S5, S2, S4, S6, respectively shown in FIG. 18.

As shown in FIG. 19, the switching modes k1 to k6 correspond to actual voltage vectors having the constant magnitudes, respectively. To the contrary, the switching mode k0 corresponds to such a switching state that all of the three phases U, V, W of the upper arms are turned OFF, and also, all of the three phases X, Y, Z of the lower arms are turned ON. Also, the switching mode k7 corresponds to such a switching state that all of the three phases U, V, W of the upper arms are turned ON, and also, all of the three phases X, Y, Z of the lower arms are turned OFF. Both the switching mode k0 and the switching mode k7 correspond to zero voltage vectors whose magnitudes are equal to zero.

The PWM pattern selector circuit 811 is such a circuit which inputs thereinto current deviations ΔiU, ΔiV, ΔiW, and the voltages VRU, VRV, VRW of the three-phase power supply. Further, this PWM pattern selector circuit 811 selects a switching mode capable of controlling a current deviation within an allowable range, and then, outputs the selected switching mode. This PWM pattern selector circuit 811 may be constructed by, for example, a digital control circuit as shown in FIG. 2.

Figure 2:
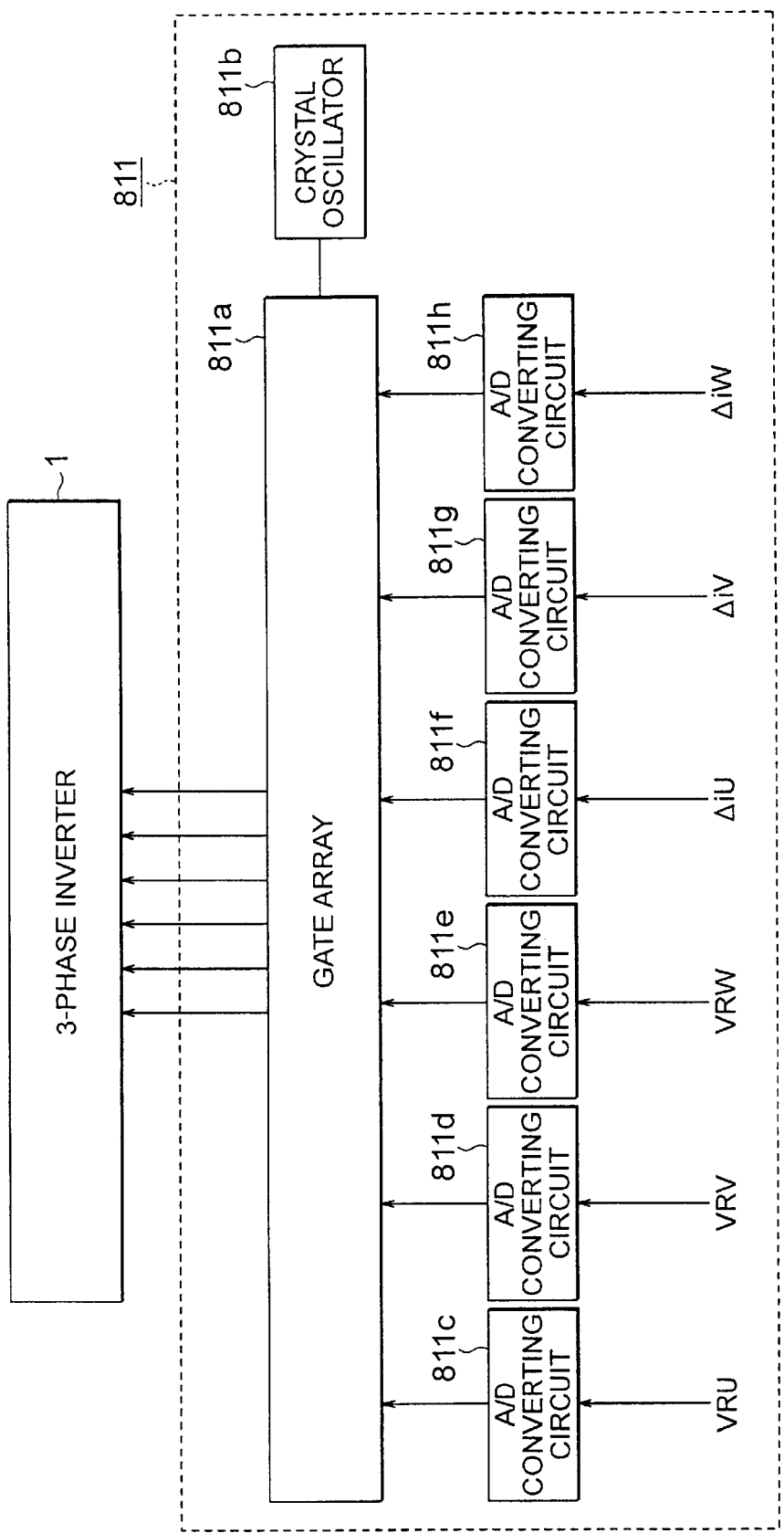
FIG. 2 is a diagram for representing an arrangement of a PWM pattern selector circuit employed in the control circuit of the power converting apparatus according to Embodiment 1 of the present invention.

In FIG. 2, reference numeral 811a shows a gate array, reference symbol 811b shows a crystal oscillator for producing a reference signal of operation timing of the gate array, and reference symbols 811c to 811h represent A/D converting circuits for converting an analog signal into a digital signal.

The gate array 811a acquires both the current deviations Δiu, ΔiV, ΔiW and the voltages VRU, VRV, VRW of the three-phase power supply via the A/D converting circuits 811c to 811h in such an interval of 1 to 100 micro seconds, and obtains such a switching mode by which a current deviation is located within the allowable range (region (7)).

Figure 3:
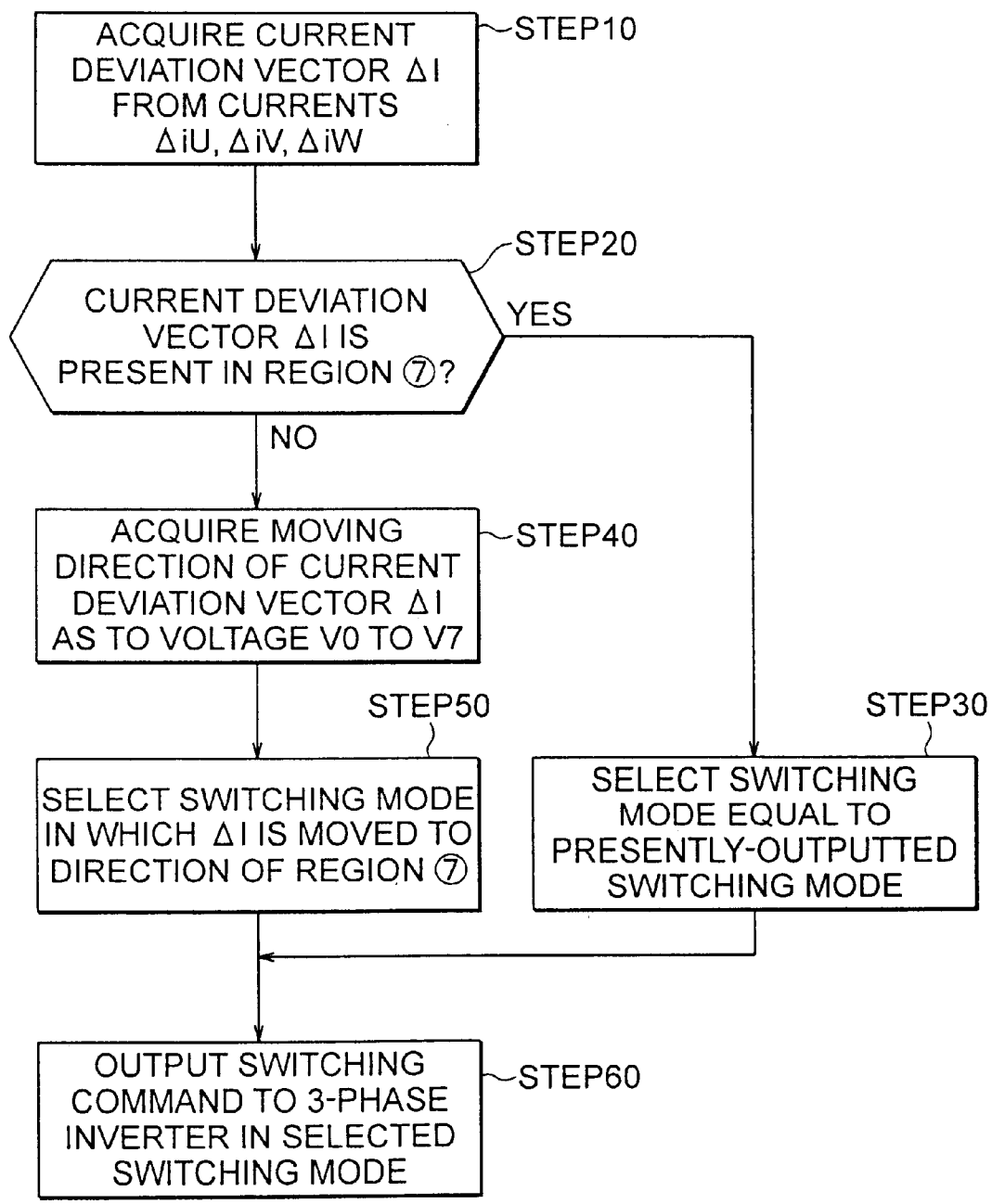
FIG. 3 is a flow chart for describing operations of the control circuit of the power converting apparatus according to Embodiment 1 of the present invention.

FIG. 3 is a flow chart for describing a process operation executed in the gate array 811a.

At a STEP 10 of this flow chart, a current deviation vector ΔI is obtained from the current deviations ΔiU, ΔiV, ΔiW.

Figure 20:
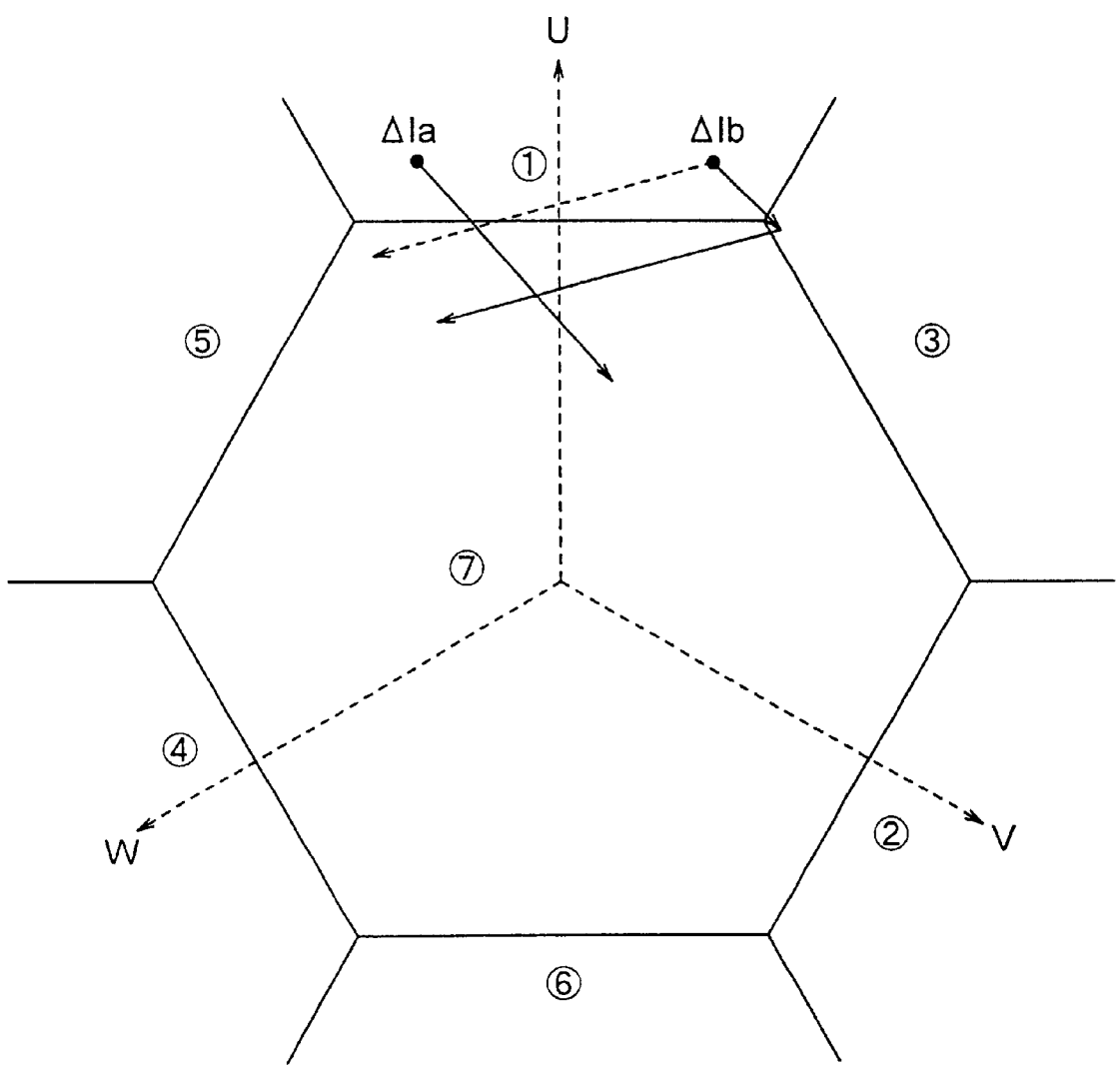
FIG. 20 is a diagram for representing a current deviation vector for the conventional control circuit of the power converting apparatus.

Next, at a STEP 20, a judgement is made as to whether or not this current deviation vector ΔI is present in the region (7) shown in FIG. 20. When this current deviation vector ΔI is present in the region (7), a switching mode to be outputted is not changed (STEP 30).

On the other hand, when this current deviation vector ΔI is not located in the region (7), a check is made that the current deviation vector ΔI is moved to which direction in the respective cases that the three-phase inverter main circuit 1 outputs the voltage vectors V0 to V7, respectively, at a STEP 40. As will be discussed later, the moving direction of the current deviation vector ΔI is equal to such a vector direction between the three-phase power supply voltage and the output voltage of the three-phase inverter main circuit 1.

Next, at a STEP 50, the following switching modes are selected, by which such voltage vectors, in which the moving directions of the current deviations ΔI with respect to the voltage vectors V0 to V7 are directed to the region (7) shown in FIG. 20, are outputted.

Subsequently, at a STEP 60, a PWM pattern corresponding to the selected switching mode is formed. In other words, an ON/OFF command of each of the switching elements is produced, and then, is outputted from the gate array 811a. In this case, while the dimension of the region (7) corresponds to the allowable range of the current deviation vector ΔI, a deviation between a current command value and an inverter current owns a direct proportional relationship with respect to a dimension of one edge of a hexagonal shape of the region (7). Also, while the region (7) is made into such a hexagonal shape directed to the current deviations of the respective phases, other shapes such as a circular shape and a rectangular shape may be employed as the shape of this region (7) as long as these shapes can satisfy the allowable range.

Next, a description is made of such a fact that a moving direction of the current deviation vector ΔI may become such a direction of a difference vector between a three-phase power supply voltage and an inverter output voltage. A relationship among an inverter voltage vector VA, a three-phase power supply voltage vector VR, and a voltage vector VL applied to a reactor is given by the following formula (1):

$$VL = L \times di/dt = VA - VR \tag{1}$$

Symbol L indicates an inductance value of the reactor. In this case, considering now that a current IA (T1) during time duration T1 is understood as such a current IA (T1+ΔT) after the voltage vector VL is applied to the reactor and ΔT time duration has passed, and the three-phase power supply voltage VR is constant during a time duration defined from T1 up to T1+ΔT, the below-mentioned formula (2) can be satisfied:

$$IA(T1+\Delta T) - IA(T1) = (\Delta T/L) \times (VA - VR) \tag{2}$$

Also, the current deviation Δi(T1+ΔT) at this time is given by the following formula (3):

$$\Delta i(T1+\Delta T) = IA^*(T1+\Delta T) - IA(T1+\Delta T) \tag{3}$$

Considering now that the inverter current command value IA* is constant during a time duration defined from T1 up to T1+ΔT, the below-mentioned formula (4) can be satisfied based upon the above-described formulae (2) and (3):

$$\Delta i(T1+\Delta T) - \Delta i(\Delta T) = (\Delta T/L) \times (VR - VA) \tag{4}$$

When it is so regarded that both the three-phase power supply voltage vector VR and the inverter current command value IA* are constant during the time duration ΔT, the following fact can be understood from this formula (4). Namely, a change in the current deviations Δi per the time duration ΔT may be determined based upon a difference between the three-phase power supply voltage vector VR and the inverter output voltage VA. While the above-explained formulae are expressed by the scaler amounts, if these scaler amounts are extended on the vector on the UVW coordinate system, then the current deviation vector ΔI is moved along the direction of the difference vector between the three-phase power supply voltage vector and the inverter output voltage vector.

Figure 4:
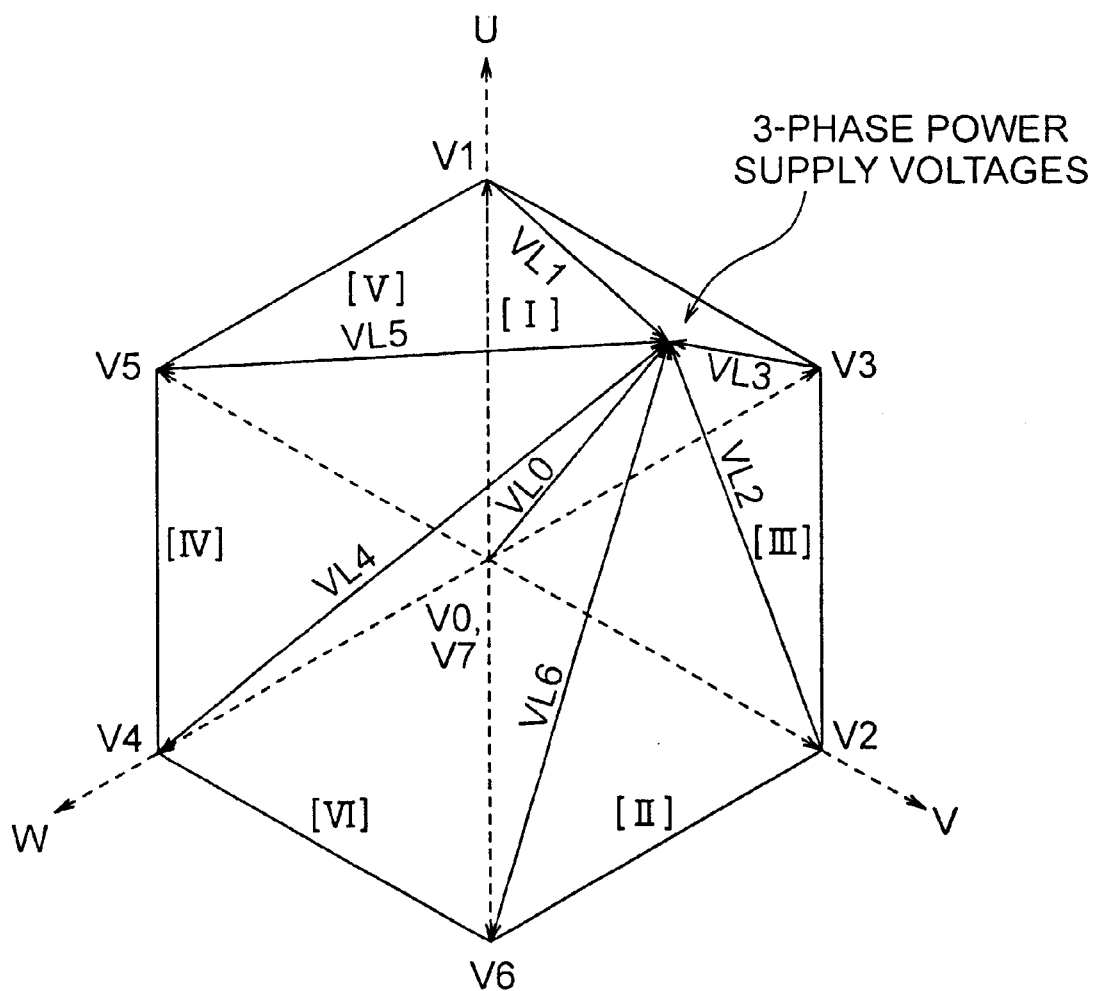
FIG. 4 is a diagram for indicating a three-phase power supply In voltage vector for the control circuit of the power converting apparatus according to Embodiment 1 of the present invention.

For instance, as shown in FIG. 4, when the three-phase power supply voltage vector is located in the region [I], the following calculation is carried out at the above-described STEP 40. That is, difference vectors between the three-phase power supply voltage and the output voltage vectors V0 to V7 of the three-phase inverter main circuit 1 may become VL0 to VL6 in this drawing. In this case, symbol VL0 is such a difference vector corresponding to the zero vector V0, or V7. Since the current deviation vector ΔI is moved to the direction of the difference vector VL, when the current deviation vector ΔI is located at the position shown in FIG. 5, if the difference vectors are equal to VL0, VL2, VL4, VL6, then the current deviation vector ΔI is moved to the direction of the region (7). As a consequence, in this case, any one of the switching modes k0, k2, k4, k6, and k7 may be selected at the above-explained STEP 50.

As explained above, since it is possible to select such a proper switching mode used to enter the current deviation vector ΔI into the allowable range, the unnecessary switching operations can be avoided.

Embodiment 2

Referring now to drawings, a description is made of a control circuit of a power converting apparatus according to Embodiment 2 of the present invention.

In Embodiment 1, only such a switching mode is acquired in which the current deviation vector ΔI is moved to the direction of the region (7). In accordance with Embodiment 2, in the case that there are plural switching modes in which the current deviation vector ΔI is moved along the direction of the region (7), this control circuit of the power converting apparatus is so arranged as to select such a switching mode in which a changing interval of a switching mode is prolonged.

Figure 6:
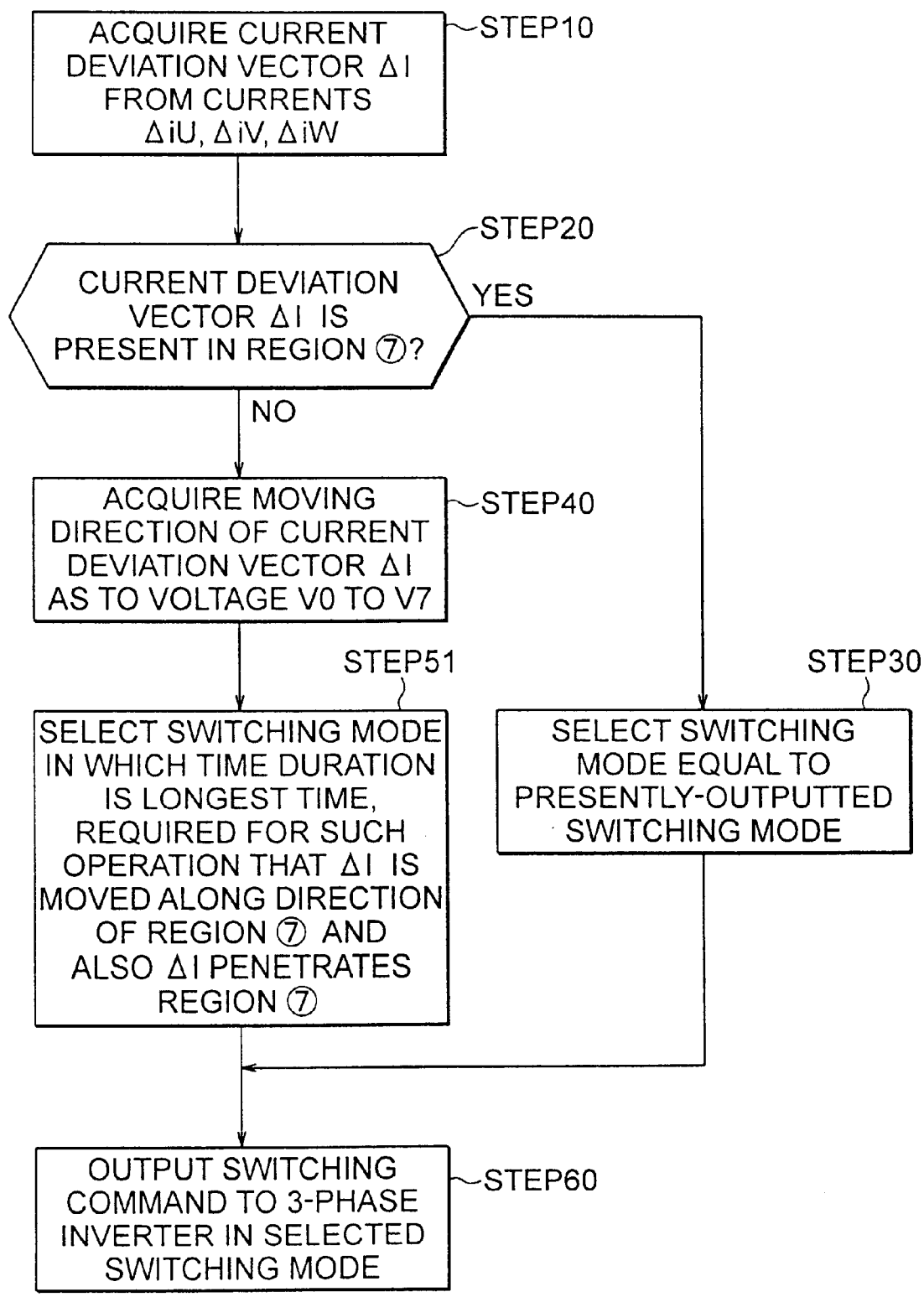
FIG. 6 is a flow chart for describing operations of a control circuit of a power converting apparatus according to Embodiment 2 of the present invention.

FIG. 6 is a flow chart for describing process operations executed in the gate array, according to Embodiment 2 of the present invention. A different process operation from that of Embodiment 1 is given as follows: That is, the content of the process operation at the STEP 50 is changed, and the changed content is defined as a new STEP 51, while other process operations of Embodiment 2 are similar to those of Embodiment 1.

In such a case that there are plural switch modes in which the current deviation vector ΔI is moved along the direction of the region (7), the following idea will now be considered. That is, when which switching mode is selected, a changing interval of the switching mode may be prolonged.

Figure 5:
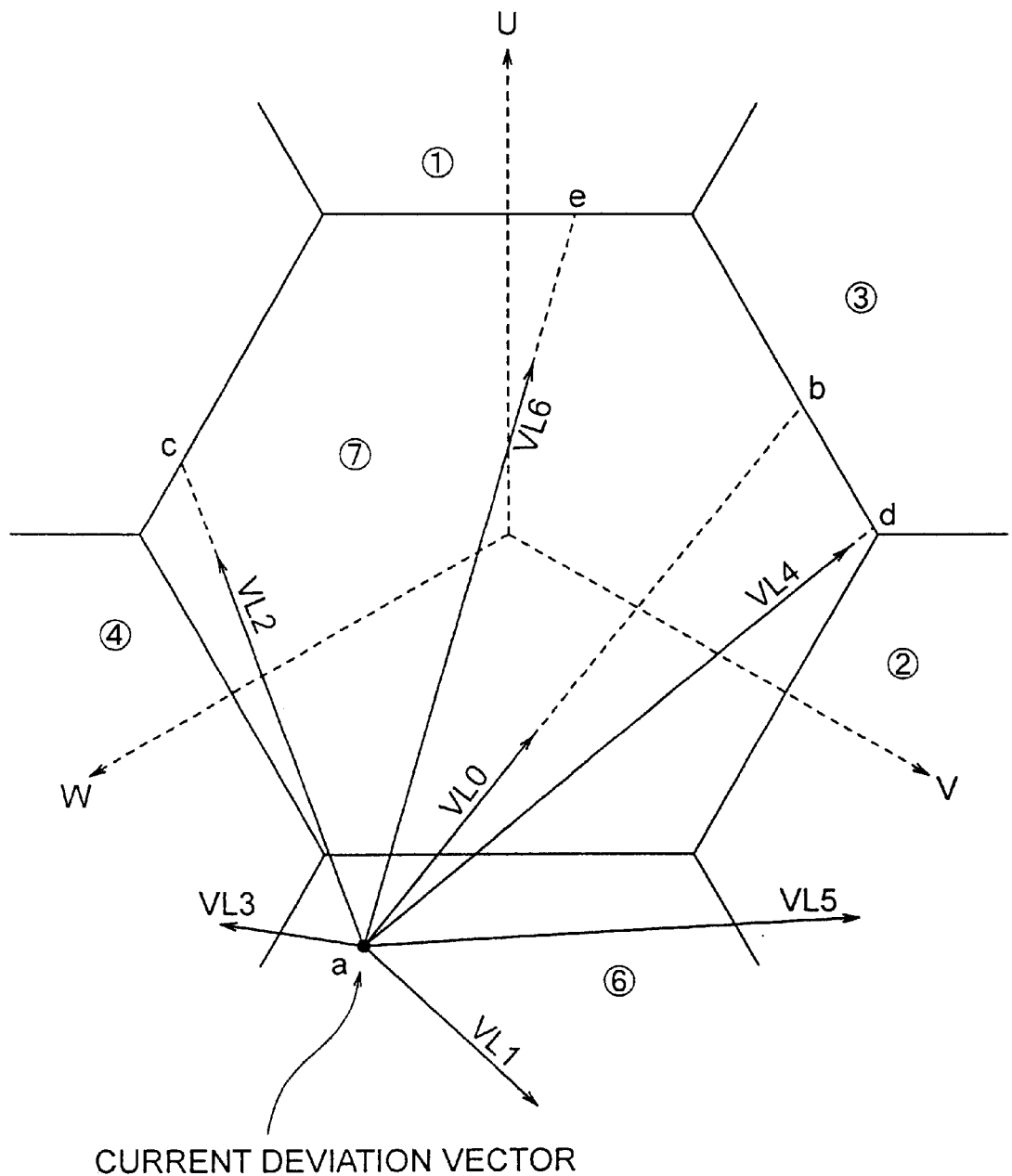
FIG. 5 is a diagram for representing a current deviation vector for the control circuit of the power converting apparatus according to Embodiment 1 of the present invention.

For example, assuming now that the current deviation vector ΔI is located at such a position as shown in FIG. 5, when the difference vectors are VL0, VL2, VL4, VL6, the current deviation vector ΔI is moved to the direction of the region (7).

In this case, while considering penetration time durations of the region (7), the comparison is made among these difference vectors. Since a change in current deviations per unit time is directly proportional to a difference between a three-phase power supply voltage and an inverter output voltage, a current deviation vector moving speed is directly proportional to magnitudes of the difference vectors, which is apparent from the above-explained formula (4). With respect to each of the difference vectors VL0, VL2, VL4, VL6, penetration time durations TVL0, TVL2, TVL4, TVL6 of the region (7) will be calculated, respectively.

$$TVL0=1/L\times(\text{length of line segment a-b})/|VL0| \quad (5)$$

$$TVL2=1/L\times(\text{length of line segment a-c})/|VL2| \quad (6)$$

$$TVL4=1/L\times(\text{length of line segment a-d})/|VL4| \quad (7)$$

$$TVL6=1/L\times(\text{length of line segment a-e})/|VL6| \quad (8)$$

If such a switching mode is selected which corresponds to the difference vector by which the penetration time duration is the longest time, then such a time duration in which the current deviation vector ΔI remains in the region (7) becomes the longest time. Subsequently, this current deviation vector ΔI is located outside the region (7), and then, the time interval until the switching mode is newly changed may become the longest interval.

In the case of FIG. 5, the penetration time duration TVL0 becomes the longest time, and thus, either the switching mode k0 or the switching mode k7 may be selected. As explained above, at the STEP 51 of FIG. 6, such a switching mode is selected in which the current deviation vector ΔI is moved to the direction of the region (7), and furthermore, the time duration required for which the current deviation vector ΔI penetrates the region (7) becomes the longest time.

Since the control circuit of the power converting apparatus according to Embodiment 2 is arranged in the above-explained manner, the proper switching mode in which the current deviation vector ΔI is entered into the allowable range can be selected. As a result, the unnecessary switching operation can be avoided, and furthermore, the time interval for changing the switching mode can be made long, so that a total number of the switching operations can be reduced.

Embodiment 3

Referring now to drawings, a description is made of a control circuit of a power converting apparatus according to Embodiment 3 of the present invention.

In Embodiment 2, the time duration for which the current deviation vector ΔI passes through the region (7) is considered to select the switching mode. In Embodiment 3, in such a case that a presently selected switching mode is changed into a newly selected switching mode, the control circuit of the power converting apparatus is arranged as follows: Considering now to how many arms among the three arms of the three-phase inverter main circuit 1 require the switching operations, a proper switching mode is selected based upon penetration time duration and a total number of switching operations in changing the switching mode.

For example, as indicated in FIG. 4, when the three-phase power supply voltage vector is located in the region [I], at a STEP 40, it is so calculated that difference vectors between the three-phase power supply voltage and the output voltage vectors V0 to V7 of the three-phase inverter main circuit 1 are equal to VL0 to VL6 shown in FIG. 4. In this case, symbol VL0 indicates a difference vector corresponding to the zero vectors V0 and V7.

Figure 7:
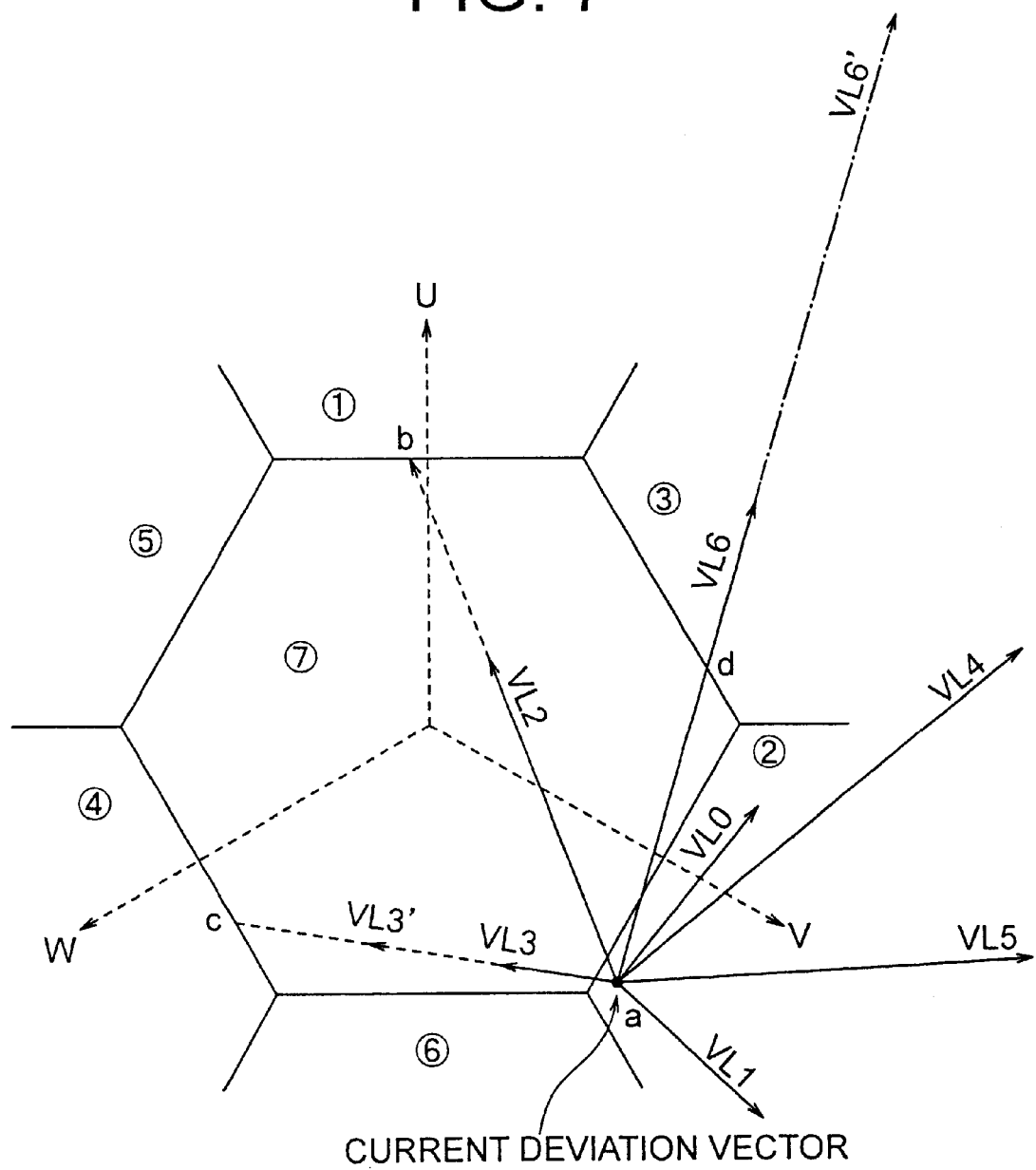
FIG. 7 is a diagram for representing a current deviation vector for a control circuit of a power converting apparatus according to Embodiment 3 of the present invention.

Since the current deviation vector ΔI is moved along the direction of the difference vector VL, assuming now that the current deviation vector ΔI is located at a position shown in FIG. 7, when the difference vectors are equal to VL2, VL3, VL6, this current deviation vector ΔI is moved to the direction of the region (7). Then, penetration time durations TVL2, TVL3, TVL6 of the region (7) are calculated every difference vectors VL2, VL3, VL6.

$$TVL2=1/L\times(\text{length of line segment a-b})/|VL2| \quad (9)$$

$$TVL3=1/L\times(\text{length of line segment a-c})/|VL3| \quad (10)$$

$$TVL6=1/L\times(\text{length of line segment a-d})/|VL6| \quad (11)$$

In the above-explained arrangement of Embodiment 2, the penetration time duration TVL3 becomes the longest time in the case of FIG. 7, so that the switching mode k3 is selected.

In Embodiment 3, in addition to the evaluation of the penetration time duration of the region (7), the following condition is considered: When the presently selected switching mode is changed into the newly selected switching mode, how many arms among the three arms of the three-phase inverter main circuit 1 require the switching operations.

In FIG. 7, in the case that the previously selected switching mode is k0, a total number of arms which execute the switching operations when the switching modes k2, k3, k6 are selected becomes 1, 2, 2, respectively. If there are such switching modes in which the penetration time durations of the region (7) are identical to each other, then such a switching mode in which a total number of the arms for executing the switching operations is small may be selected when the present switching state is changed into the next switching mode. As a result, the switching frequency of the inverter may be reduced.

To this end, with respect to the penetration time duration TVL of the region (7), a new evaluation function WTVL to which a weight given in FIG. 8 has been applied is employed.

In the case of FIG. 7, evaluation functions WTVL corresponding to the difference vectors VL2, VL3, VL6 are defined by the following formulae;

$$\text{WTVL2}=1/L\times(\text{length of line segment a-b})/(|\text{VL2}|\times\text{W02}) \quad (12)$$

$$\text{WTVL3}=1/L\times(\text{length of line segment a-c})/(|\text{VL3}|\times\text{W03}) \quad (13)$$

$$\text{WTVL6}=1/L\times(\text{length of line segment a-d})/(|\text{VL6}|\times\text{W06}) \quad (14)$$

Symbols W02, W03, W06 correspond to a total number of arms required for switching operations. These arm numbers may be given in FIG. 8 based upon such a switching mode which has been previously selected and is presently outputted by the three-phase inverter 1, and also a switching mode which is to be calculated for the evaluation function WTVL.

|  |  |
|---|---|
| W02 = 1 | (15) |
| W03 = 2 | (16) |
| W06 = 2 | (17) |

The weight W is equal to such a value that a dimension of a difference vector is equivalently multiplied by weight so as to evaluate the penetration time duration of the region (7). In the case of FIG. 7, while the difference vector VL3 is employed as VL3' and the difference vector VL6 is employed as VL6', a selection is made of such a switching mode that the time duration required to penetrate through the region (7) is the longest time. In the case of FIG. 7, the evaluation function WTVL2 corresponds to the longest time duration, and the switching mode k2 is selected.

Figure 9:
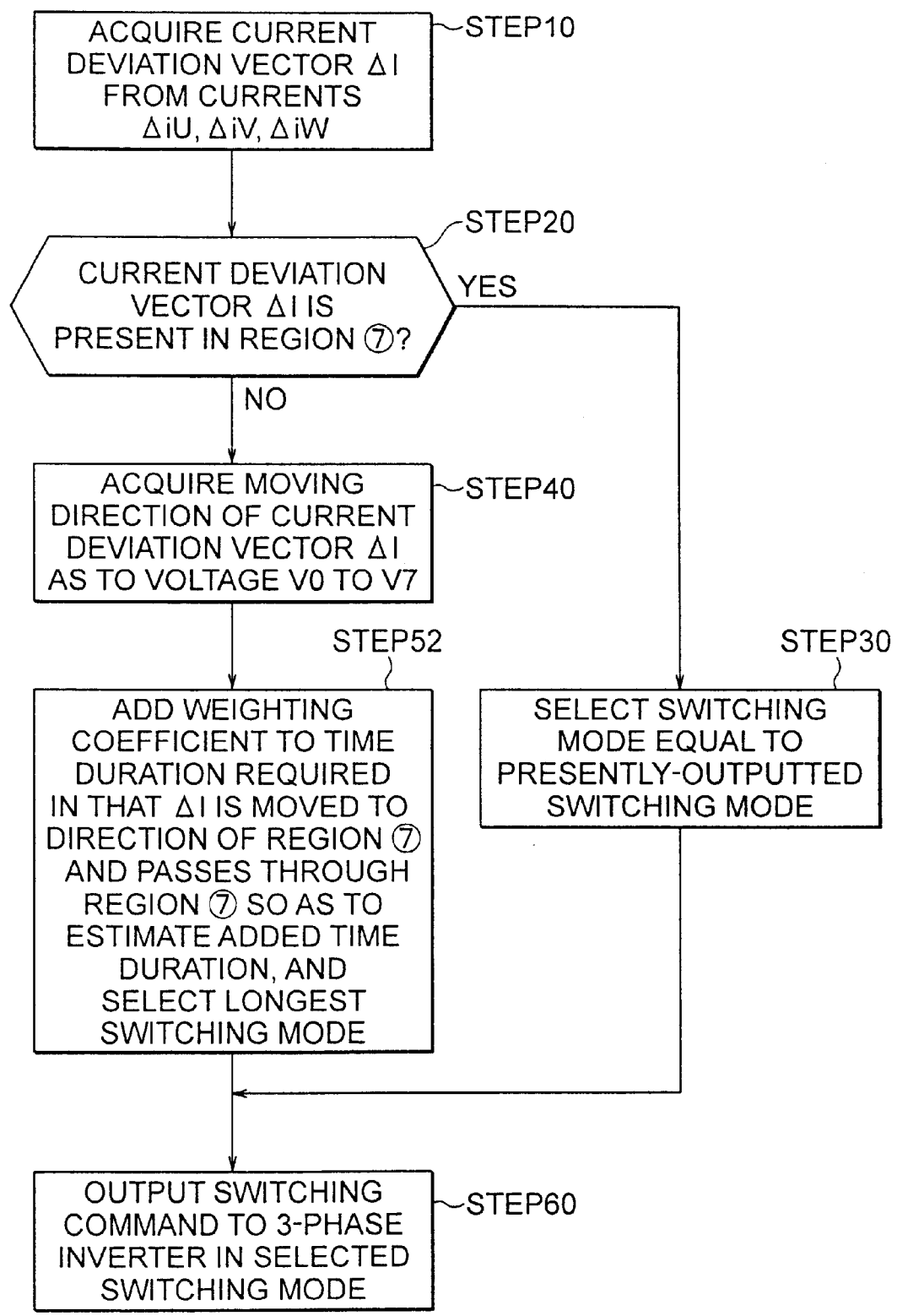
FIG. 9 is a flow chart for explaining operations of the control circuit of the power converting apparatus according to Embodiment 3 of the present invention.

FIG. 9 is a flow chart for describing process operations executed in the gate array, according to Embodiment 3 of the present invention. A different process operation from that of Embodiment 2 is given as follows: That is, the content of the process operation at the STEP 51 is changed, and the changed content is defined as a new STEP 52, while other process operations of Embodiment 3 are similar to those of Embodiment 2.

At the STEP 52, with respect to such a time duration required for such an operation that the current deviation vector ΔI is moved to the direction of the region (7), and further, the current deviation vector ΔI penetrates through the region (7), a weight is added so as to evaluate the resultant time duration. This weight corresponds to a total number of arms used to execute the switching operations. Then, an optimum switching mode is selected in order to lower the switching frequency.

Since the control circuit of the power converting apparatus according to Embodiment 3 is arranged in the above-explained manner, the proper switching mode in which the current deviation vector ΔI is entered into the allowable range can be selected. As a result, the unnecessary switching operation can be avoided, and furthermore, the optimum switching mode can be selected in order to reduce the switching frequency.

Embodiment 4

Referring now to drawings, a description is made of a control circuit of a power converting apparatus according to Embodiment 4 of the present invention.

Both the switching mode k0 and the switching mode k7 correspond to zero voltage vectors, the dimensions of which are equal to zero. In view of current control performance, even when any one of the switching modes k0 and k7 is selected, the same operation may be obtained. In accordance with Embodiment 4, in addition to Embodiment 3, the following method will now be explained. That is , when the zero voltage vector is outputted, the switching modes k0 and k7 are selected in order to reduce a total number of switching operations.

In Embodiment 3, the weight is determined based upon the table of FIG. 8 without distinguishing the switching mode k0 from the switching mode k7. To the contrary, in accordance with Embodiment 4, the following technical difference is employed. That is, both a weight required when the present switching mode is changed into the switching mode k0, and another weight required when the present switching mode is changed into the switching mode k7 are determined based on a table of FIG. 10. This table is indicated by a total number of arms required for the switching operations. Other operations of Embodiment 4 are similar to those of Embodiment 3.

Since the control circuit of the power converting apparatus according to Embodiment 4 is arranged in the above-explained manner, the power switching mode in which the current deviation vector ΔI is entered into the allowable range can be selected. As a result, the unnecessary switching operation can be avoided, and furthermore, the optimum switching modes required to reduce the switching frequency can be selected, while including the method for selectively using the two zero voltage vectors.

Embodiment 5

Referring now to drawings, a description is made of a control circuit of a power converting apparatus according to Embodiment 5 of the present invention.

In Embodiment 1, the position of the hexagon region (7) is arranged such that the respective edges of the hexagon are intersected to each other at the right angle with respect to the axes U, V, W of the UVW coordinate system. In accordance with Embodiment 5, the following technical different point as to the arrangement of the hexagon is made. That is, the hexagon is arranged so as to be rotated at an angle of 30 degrees with respect to the arrangement of Embodiment 1. Other arrangements of Embodiment 5 are similar to those of Embodiment 1.

Figure 11:
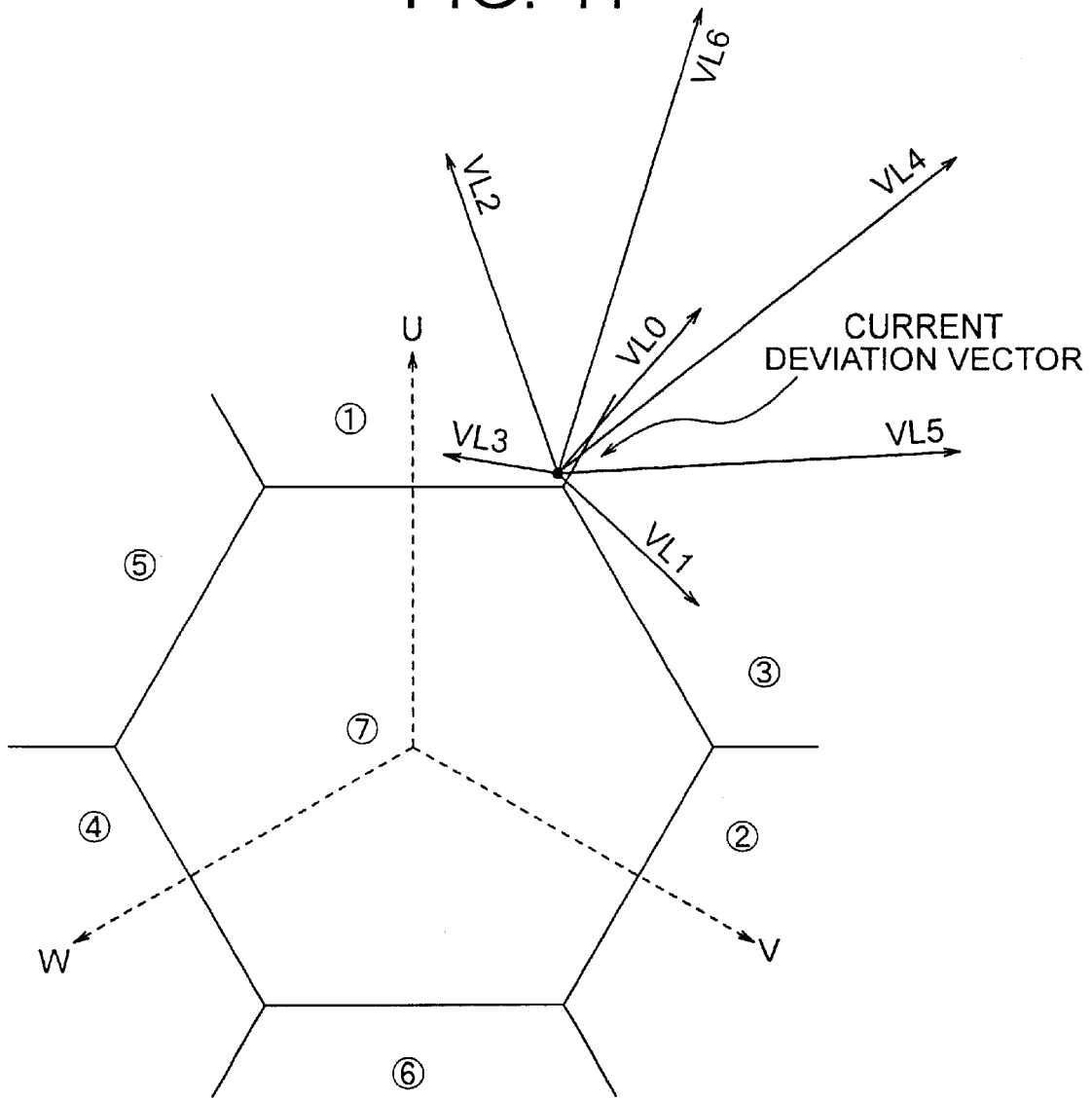
FIG. 11 is a diagram for explaining a current deviation vector for a control circuit of a power converting apparatus according to Embodiment 5 of the present invention.

For instance, as indicated in FIG. 4, in such a case that the three-phase power supply voltage vector is located in the region [I], difference vectors between the three-phase power supply voltage and the output voltage vectors V0 to V7 of the three-phase inverter main circuit 1 may become VL0 to VL6 shown in this drawing. Since the current deviation vector ΔI is moved along the direction of the difference vector, assuming now that the current deviation vector ΔI is located at a position shown in FIG. 11, any one of these difference vectors cannot move the current deviation vector ΔI to the direction of the region (7).

Figure 12:
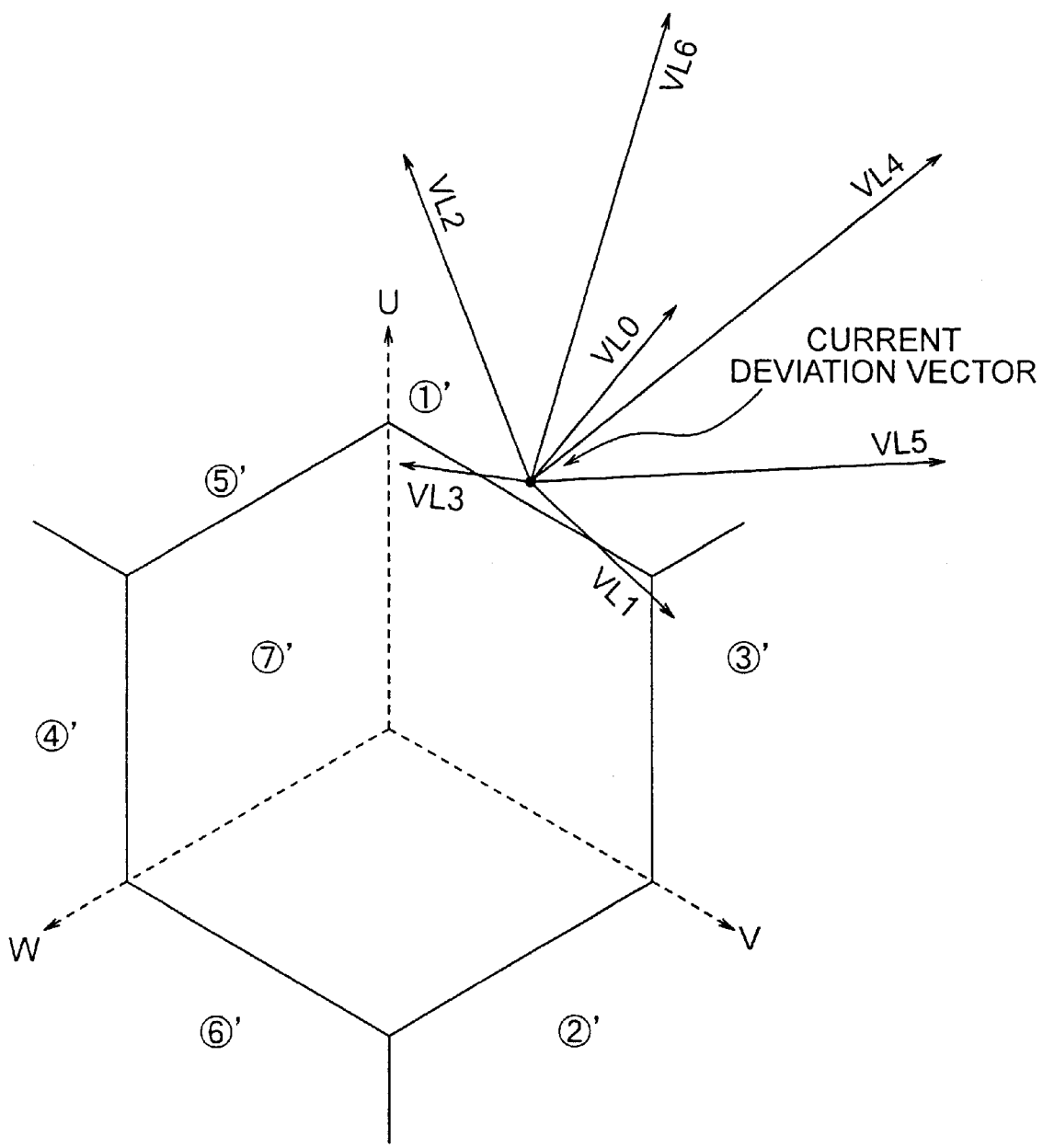
FIG. 12 is a diagram for representing a current deviation vector for the control circuit of the power converting apparatus according to Embodiment 5 of the present invention.

To the contrary, FIG. 12 is a diagram for indicating a position of the hexagon region (7) in Embodiment 5. From this drawing, the following fact can be revealed. That is, even under the same condition as that of FIG. 11, the difference vectors VL1 and VL3 are present as such difference vectors for moving the current deviation vector ΔI to the direction of the region (7), and thus, the current control can be carried out. This is because the position of the hexagon region (7) is arranged such that the respective edges of the hexagon are intersected at an angle of 60 degrees with respect to the present voltage vectors of the switching modes k1 to k6.

Since the control circuit of the power converting apparatus according to Embodiment 5 is arranged in the above-explained manner, the proper switching mode in which the current deviation vector ΔI is entered into the allowable range can be firmly selected. As a result, the unnecessary switching operation can be avoided.

Embodiment 6

Referring now to drawings, a description is made of a control circuit of a power converting apparatus according to Embodiment 6 of the present invention.

Since there are adverse influences caused by delay time of a switching element of an inverter and also delay time of a current sensor, even when a switching mode is changed, there is a certain possibility that a lengthy time duration is required in order to enter the current deviation vector ΔI into the region (7). This lengthy time duration will be referred to as response waste time hereinafter.

In the process operation described in the flow chart of Embodiment 1 shown in FIG. 3, if the current deviation vector ΔI is located outside the range of the region (7), then the switching mode is continuously selected. As a result, there are some cases that the switching mode which has been selected and is presently outputted is not equal to the optimum switching mode, depending upon a change in three-phase power supply voltages and also a change in current command values within the response waste time. In this case, the switching mode is again set, so that unnecessary switching operation should be carried out.

Figure 13:
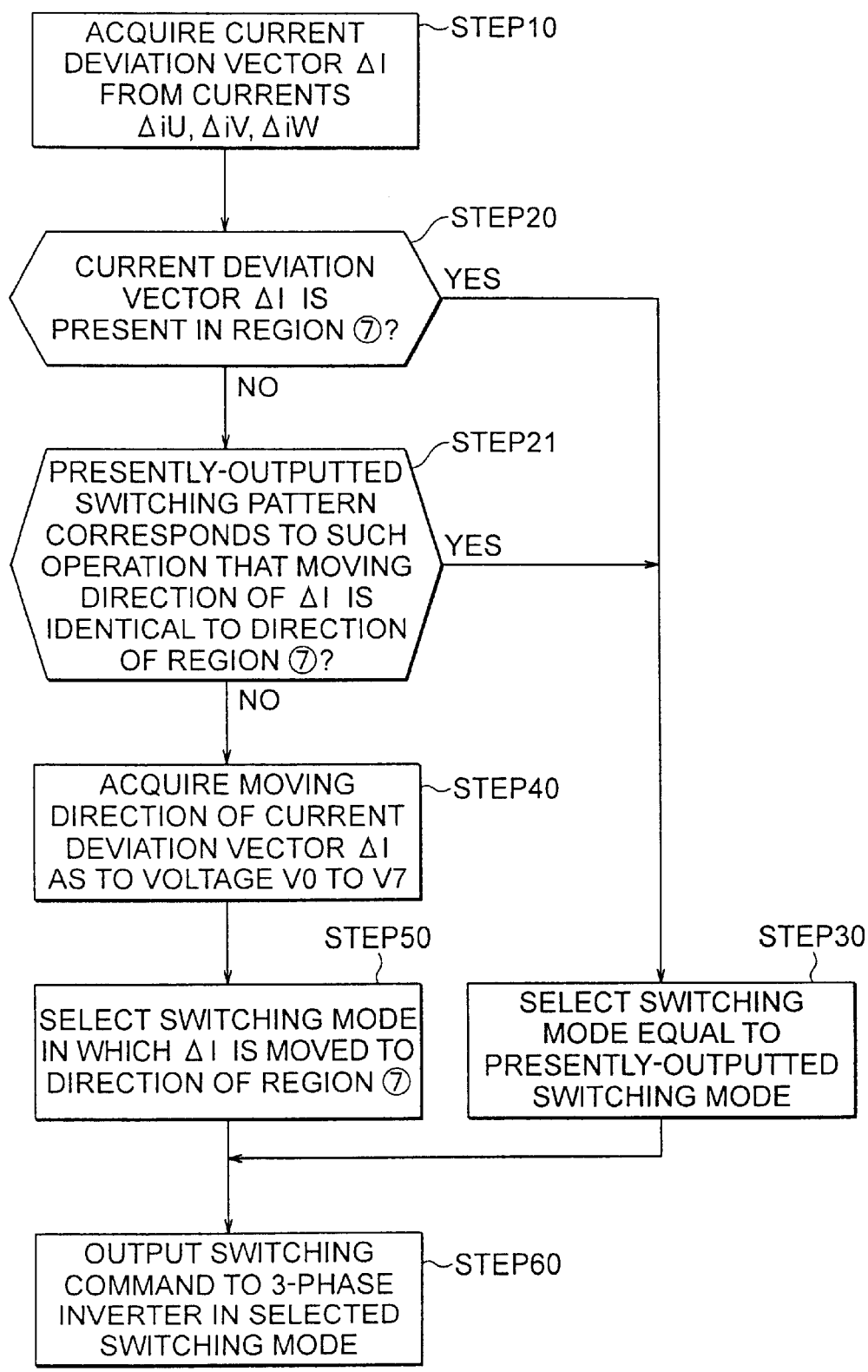
FIG. 13 is a flow chart for describing operations of a control circuit of a power converting apparatus according to Embodiment 6 of the present invention.

In accordance with Embodiment 6, a process operation defined in a flow chart of FIG. 13 is carried out in order to solve the above-explained problem. Other operations of Embodiment 6 are similar to those of Embodiment 1.

The flow chart shown in FIG. 13 is constructed by adding a STEP 21 to the flow chart indicated in FIG. 3.

Even when such a judgment is made at a STEP 20 that the current deviation vector ΔI is located outside the range of the region (7), if the presently outputted switching mode may cause the current deviation vector ΔI to be moved to the direction of the region (7) at the next STEP 21, then the switching mode to be outputted is not changed (STEP 30).

Since the control circuit of the power converting apparatus according to Embodiment 6 is arranged in the above-explained manner, the proper switching mode in which the current deviation vector ΔI is entered into the allowable range can be selected. As a result, the unnecessary switching operation can be avoided, which is caused by the adverse influences made by the delay time of the switching element and also the delay time of the current sensor employed in the inverter.

Embodiment 7

Referring now to drawings, a description is made of a control circuit of a power converting apparatus according to Embodiment 7 of the present invention.

Both the switching mode k0 and the switching mode k7 correspond to zero voltage vectors, the dimensions of which are equal to zero. In view of current control performance, even when any one of the switching modes k0 and k7 is selected, the same operation may be obtained. In accordance with Embodiment 7, in addition to Embodiment 3, the following method will now be explained. That is, when the zero voltage vector is outputted, the switching modes k0 and k7 are selected in order to reduce unbalanced uses of switching frequencies every phase, which are caused by fluctuations of the reactors or the like.

In Embodiment 3, the weight is determined based upon the table of FIG. 8 without distinguishing the switching mode k0 from the switching mode k7. To the contrary, in Embodiment 7, both a weight used when the switching mode k0 is changed, and another weight used when the switching mode k7 is changed are changed in accordance with the below-mentioned rules:

Rule 1:

In the case that the switching frequencies of the U-phase arm are larger than those of other phase arm, when the zero voltage vector is selected, a weight is determined based upon a table of FIG. 14 such that a selection is made of such a switching mode which does not require the switching operation of the U-phase.

Rule 2:

In the case that the switching frequencies of the V-phase arm are larger than those of other phase arm, when the zero voltage vector is selected, a weight is determined based upon a table of FIG. 15 such that a selection is made of such a switching mode which does not require the switching operation of the V-phase.

Rule 3:

In the case that the switching frequencies of the W-phase arm are larger than those of other phase arm, when the zero voltage vector is selected, a weight is determined based upon a table of FIG. 16 such that a selection is made of such a switching mode which does not require the switching operation of the W-phase.

Since the weights are utilized in the time divisional manner based upon the above-explained rules 1 to 3, the unbalanced uses of the switching frequencies every phase can be reduced. As apparent from the foregoing description, 4 sorts of weights may be utilized in the time divisional manner in addition to the weight defined in FIG. 10, which is employed so as to reduce the switching times. Furthermore, considering such a phase that a total number of switching frequencies is small, the zero voltage vector may be selected in such a manner that the switching times of this relevant phase are increased.

Since the control circuit of the power converting apparatus according to Embodiment 7 is arranged in the above-explained manner, the proper switching mode in which the current deviation vector ΔI is entered into the allowable range can be selected. As a result, the unnecessary switching operation can be avoided, and furthermore, the unbalanced uses of the switching frequencies every phase can be reduced.

Also, in the foregoing explanation, it is so assumed that the inverter current command value IA* is constant during the time duration of ΔT in the formula (3). However, since this inverter current command value IA* is changed in the actual case, the following formula (18) may be established:

$$\Delta i(T1+\Delta T)-\Delta i(\Delta T)=(\Delta T/L)\times(VR-VA)+IA^{*}(T1+\Delta T)-IA^{*}(T1) \quad (18)$$

When this formula (18) is expressed by a differentiation formula, the below-mentioned formula (19) may be obtained:

$$d/dt(\Delta i)=(1/L)\{VR+Ld/dt(IA^{*})-VA\} \quad (19)$$

Based upon the above-described formula (19), the following fact can be revealed. That is, a change in current deviations Δi may be determined based upon the three-phase power supply voltage vector VR, the differentiated component of the current command value, and the inverter output voltage VA. As a result, in such a case that the inductance value of the reactor is large, or the change rate of the current command value is large, the below-mentioned three-phase power supply voltage vector VR' defined in the following formula (20) is calculated:

$$VR'=VR+Ld/dt(IA^*) \tag{20}$$

Then, the three-phase power supply voltage vector VR employed in Embodiments 1 to 7 is replaced by this calculated voltage vector VR', so that the current deviation can be controlled with higher precision.

What is claimed is:

1. A control circuit for controlling a power converting apparatus producing a three-phase power output from input direct current power by opening and closing switches coupled to the input direct current power the control circuit comprising:

current detecting means for detecting output currents of each phase of a three-phase power converting apparatus;

three-phase current command generating means for generating three current command values;

adding/subtracting means for calculating current deviations between respective current command values and output currents;

voltage detecting means for detecting a voltage of each phase of a three-phase power supply, each phase being connected, via a respective reactor, to the power converting apparatus and for producing power supply voltage vectors from the voltages of each of the phases of the three-phase power supply that is detected; and switching command generating means for producing a current deviation vector from the current deviations, establishing an allowable region for the current deviation vector, and determining whether the current deviation vector is located within the allowable region, obtaining moving directions for the current deviation vector with respect to each of a plurality of output voltage vectors of the power converting apparatus, based upon the output voltage vectors, and selecting and outputting, from the plurality of output voltage vectors, at least one output voltage vector producing a moving direction for moving the current deviation vector toward and into the allowable region for controlling opening and closing of the switches.

2. The control circuit for controlling a power converting apparatus as claimed in claim 1 wherein said switching command generating means selects from the output voltage vectors providing a moving direction of the current deviation vector toward and into the allowable region, the output voltage vector that causes the current deviation vector to remain in the allowable region longest.

3. The control circuit for controlling a power converting apparatus as claimed in claim 2 wherein:

the power converting apparatus controlled is a three-phase inverter including a plurality of switching elements; and said switching command generating means selects, from the plurality of output voltage vectors, an output voltage vector providing a moving direction of the current deviation toward and into the allowable region to remain in the allowable region longest, and a value obtained by multiplying (i) duration of the current deviation vector within the allowable region, by (ii) a weighting coefficient, the weighting coefficient corresponding to a total switching time of said plurality of switching elements, the total switching time being required for changing switching mode of said plurality of switching elements.

4. The control circuit for controlling a power converting apparatus as claimed in claim 1 wherein said switching command generating means calculates an evaluation function, and selects, from the plurality of output voltage vectors, an output voltage vector based upon the evaluation function, the evaluation function being calculated by multiplying (i) duration of the current deviation vector within the allowable region when a zero voltage vector is output, by (ii) a weighting coefficient corresponding to total switching time of the switches, the total switching time being required for changing switching mode of the switches.

5. The control circuit for controlling a power converting apparatus as claimed in claim 1 wherein the allowable region for the current deviation vector is represented on graph by a hexagonal area.

6. The control circuit for controlling a power converting apparatus as claimed in claim 5 wherein respective edges of the hexagonal area intersect respective voltage vectors output from the power converting apparatus at right angles.

7. The control circuit for controlling a power converting apparatus as claimed in claim 5 wherein respective edges of the hexagonal area intersect respective voltage vectors output from the power converting apparatus at an angle of 60°.

8. The control circuit for controlling a power converting apparatus as claimed in claim 1 wherein, when the current deviation vector, after movement, is not in the allowable region, said switching command generating means does not change a switching command output if a presently output switching command causes the current deviation vector to move in a direction toward the allowable region.

9. The control circuit for controlling a power converting apparatus as claimed in claim 1 wherein said switching command generating means calculates an evaluation function, and selects a switching mode based upon the evaluation function, the evaluation function being calculated by multiplying (i) duration of the current deviation vector in the allowable region when a zero voltage vector is output, by (ii) a weighting coefficient determined by unbalanced switching times for each of the phases, for changing the switching mode.

10. The control circuit for a power converting apparatus as claimed in claim 1 wherein said switching command generating means acquires the moving direction of the current deviation vector based upon a rate of change of a current command.

* * * * *